(12) United States Patent
Sweeney

(10) Patent No.: US 11,251,590 B2
(45) Date of Patent: Feb. 15, 2022

(54) CABLE SNAKE

(71) Applicant: ECM Industries, LLC, New Berlin, WI (US)

(72) Inventor: Matthew W. Sweeney, Ringwood, IL (US)

(73) Assignee: ECM Industries, LLC, New Berlin, WI (US)

( * ) Notice: Subject to any disclaimer, the term of this patent is extended or adjusted under 35 U.S.C. 154(b) by 178 days.

(21) Appl. No.: 16/040,124

(22) Filed: Jul. 19, 2018

(65) Prior Publication Data

US 2019/0027905 A1    Jan. 24, 2019

Related U.S. Application Data

(60) Provisional application No. 62/534,581, filed on Jul. 19, 2017.

(51) Int. Cl.
| | |
|---|---|
| *H02G 1/08* | (2006.01) |
| *B65H 75/44* | (2006.01) |
| *B65H 75/40* | (2006.01) |
| *B65H 75/28* | (2006.01) |
| *H02G 11/02* | (2006.01) |

(52) U.S. Cl.
CPC ............ *H02G 1/085* (2013.01); *B65H 75/28* (2013.01); *B65H 75/40* (2013.01); *B65H 75/446* (2013.01); *B65H 75/4471* (2013.01); *H02G 1/083* (2013.01); *B65H 2701/376* (2013.01); *H02G 11/02* (2013.01)

(58) Field of Classification Search
CPC .. G01B 3/1041; G01B 3/1046; G01B 3/1005; G01B 3/1043; G01B 2003/1012; H02G 11/02; H02G 1/085; H02G 1/083; B65H 75/406; B65H 2701/376; B65H 75/446; B65H 75/4471; B65H 75/40; B65H 75/28
USPC ...... 242/395, 393, 405.3, 407; 254/134.3 FT
See application file for complete search history.

(56) References Cited

U.S. PATENT DOCUMENTS

| | | | | |
|---|---|---|---|---|
| 3,078,058 | A * | 2/1963 | Roe ................. | G01B 3/1041 242/395 |
| 3,208,121 | A * | 9/1965 | Price ................ | H02G 11/02 242/388.1 |
| 5,505,230 | A * | 4/1996 | Bartholomew ...... | H02G 3/0481 138/164 |
| 5,649,674 | A * | 7/1997 | Cielker ............ | B65H 75/364 242/396.8 |
| 6,065,708 | A * | 5/2000 | Matsubara ........ | H02G 11/02 242/388.1 |

(Continued)

OTHER PUBLICATIONS

Home Depot Commercial Electric 15 Feet steel fish tape (Year: 2020).*
Gardner Bender 15 Feet Mini Cable Snake (Year: 2020).*

*Primary Examiner* — Mahdi H Nejad
(74) *Attorney, Agent, or Firm* — Wood Herron & Evans LLP

(57) ABSTRACT

A cable snake and a method of assembling a cable snake. The cable snake may include a housing assembly defining a cavity; an actuator rotatably supported by the housing; and a tape operable to be wound into and unwound out of the cavity, the tape applying an unwinding force. A force may be applied to the actuator and the housing assembly, the force resisting the unwinding force. A retainer assembly may be provided between and integral with the actuator and the tape.

18 Claims, 34 Drawing Sheets

(56) References Cited

U.S. PATENT DOCUMENTS

| | | | | |
|---|---|---|---|---|
| 6,152,395 | A * | 11/2000 | Corriveau | B65H 75/406 242/388.6 |
| 6,224,038 | B1 * | 5/2001 | Walsten | B65H 75/406 254/134.3 FT |
| 6,786,428 | B1 * | 9/2004 | Huang | B65H 75/40 137/355.16 |
| 8,496,229 | B1 * | 7/2013 | Mayhall | B65H 75/406 254/134.3 FT |
| D885,697 | S * | 5/2020 | Brockman | D32/14 |
| 10,697,577 | B2 * | 6/2020 | Fukuda | B65D 63/16 |
| 2008/0017269 | A1 * | 1/2008 | Gudenburr | B21D 39/023 138/163 |
| 2009/0236460 | A1 * | 9/2009 | Bourke | B63B 21/04 242/395 |
| 2012/0228419 | A1 * | 9/2012 | Chen | A43C 11/165 242/395 |
| 2016/0096705 | A1 * | 4/2016 | Ryals | B65H 75/406 403/164 |
| 2019/0292005 | A1 * | 9/2019 | Miller | B65H 75/406 |

* cited by examiner

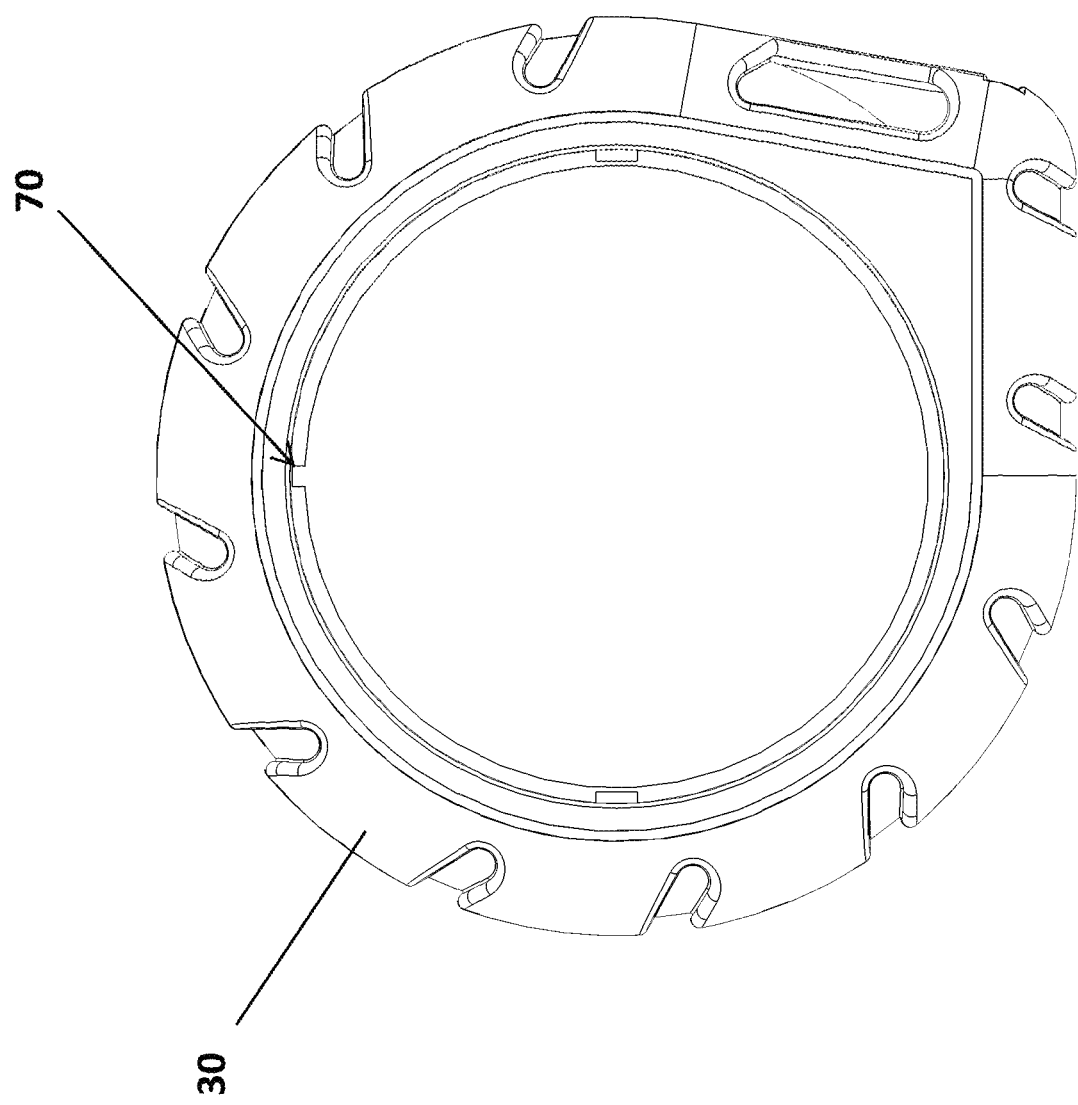

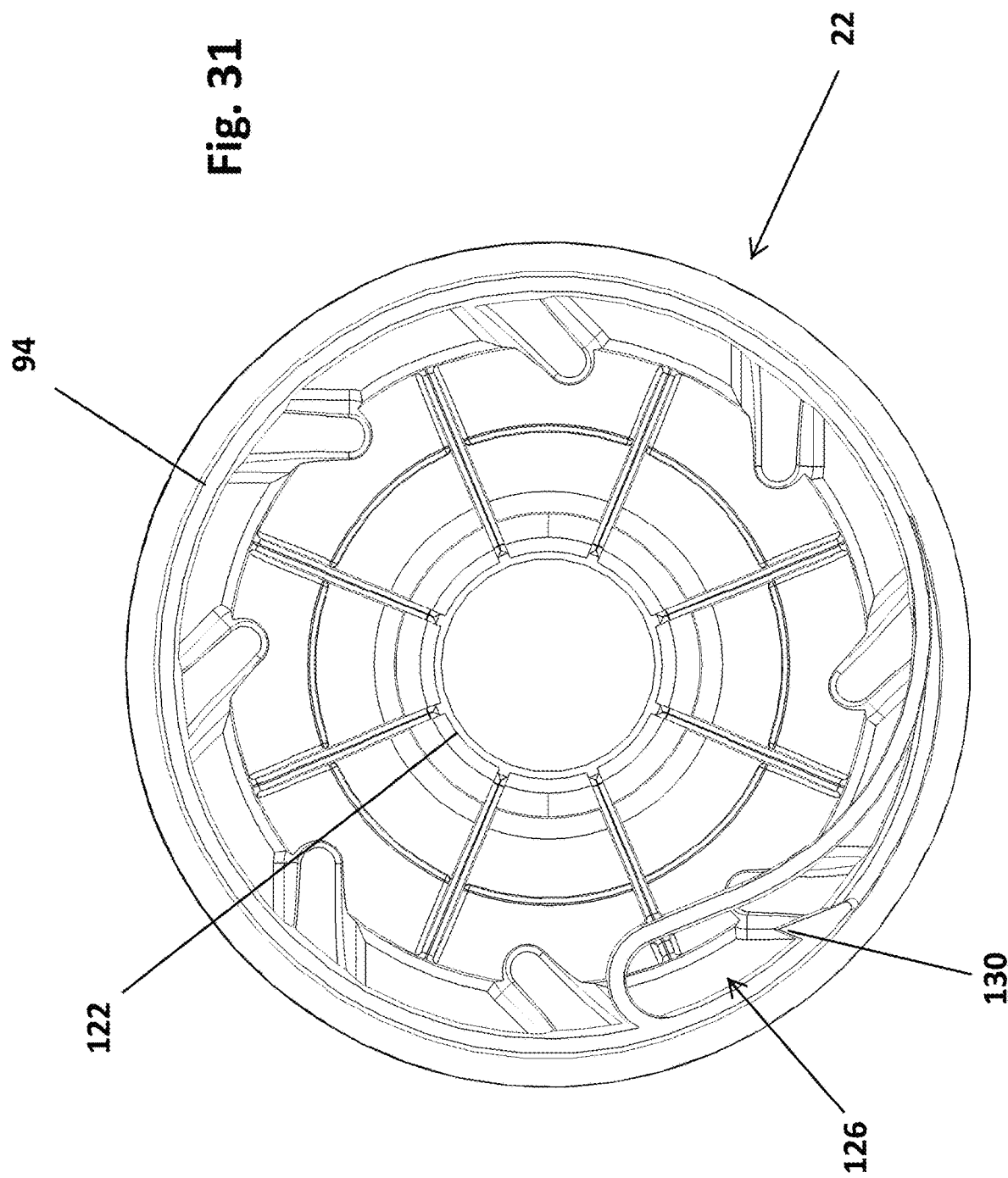

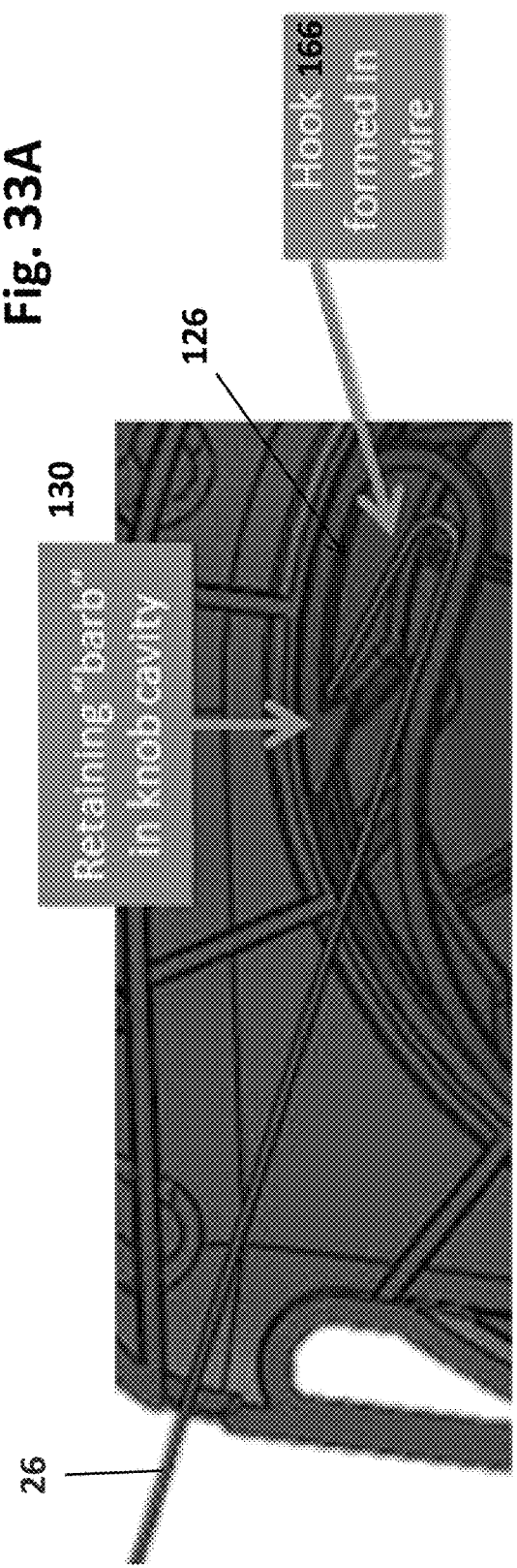
Fig. 33A
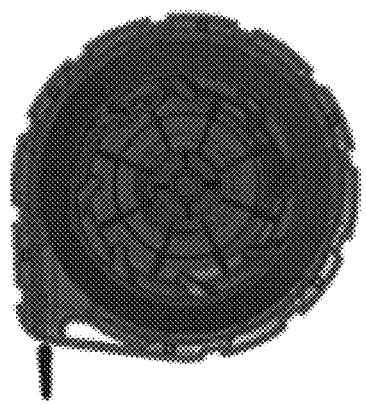
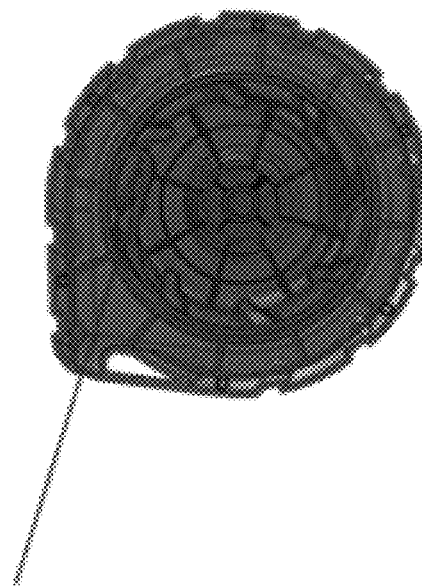
Fig. 33C
After wire is wound into housing
Fig. 33B
Insertion of the wire, after housing assembly

CABLE SNAKE

RELATED APPLICATION

The present application claims priority to U.S. Provisional Patent Application No. 62/534,581, filed Jul. 19, 2017, the entire contents of which is hereby incorporated by reference.

FIELD

The present invention generally relates to devices for installation of wires, cables, etc., and, more particularly, to fish tapes or cable snakes.

SUMMARY

"Fish Tapes" are used in the installation of electrical wiring, cables, etc., in structures. The tape is "fished" to the location where wire installation is to be initiated, the wire(s) to be installed are attached to the tip of the fish tape, and the tape is then used to pull the wire to the termination point of the installation. After use, the tape is wound into the housing.

Generally, fish tapes are used by electricians for installation of wire in conduit in industrial/commercial buildings. As a result, the tape lengths are commonly 100' or more. For homeowner or do-it-yourself (DIY) installations (e.g., wiring for a TV hung on the wall, for a home theater set-up, etc.), a tape with a length of 15' or less is suitable.

When winding the fish tape into the housing, there is a "clockspring" effect from the tape. As more tape is wound into the housing, there is increasing resistance to rotation of the housing hub. This resistance can cause winding the tape into the housing to be difficult, because, for every rotation a user makes to add tape into the housing, the spring force will rotate and unwind some amount when the handle is released to adjust grip. In some independent aspects, the present cable snake may use interference between the knob and back plate to counter this unwanted rotation.

In order to retain the fish tape in the housing, the end of the fish tape is typically fastened to the housing with a fastener. In some independent aspects, the present cable snake may use a fastener-less connection of the tape. In such aspects, a hook may be formed into the end of the tape and be received into a "pocket" with barbed feature to engage and retain the hook.

In one independent aspect, a cable snake may generally include a housing assembly defining a cavity; an actuator rotatably supported by the housing; and a tape operable to be wound into and unwound out of the cavity, the tape applying an unwinding force tending to cause the tape to be unwound, a force (e.g., tension, compression, friction, etc.) being applied to the actuator and the housing assembly to resist the unwinding force.

In some constructions, the cable snake may further include a cover on an opposite side of the housing assembly from the actuator, and the cover and the actuator may be connected to apply the force. A projection may extend from one of the cover and the actuator and engage a recess formed in the other of the cover and the actuator to apply the force. The projection may be supported on a flexible arm and selectively engageable with the recess.

In another independent aspect, a cable snake may generally include a housing assembly defining a cavity; an actuator rotatably supported by the housing and defining a pocket; a tape operable to be wound into and unwound out of the cavity; and a retainer assembly between and integral with the actuator and the tape. The retainer assembly may include a barb formed on one of the actuator and the tape and a hook formed on the other of the actuator and the tape, the barb being operable to retain the hook. In some constructions, the actuator includes a pocket operable to receive an end of the tape and the barb, and the end of the tape includes the hook.

In yet another independent aspect, a method of assembling a cable snake may be provided. The method may generally include forming a housing defining a cavity and a central opening; inserting a rotatable actuator into one side of the opening with a portion of the actuator engaging the housing; inserting a connector from an opposite side of the opening with an integral portion of the connector engaging the housing; connecting the connector to the actuator to retain the actuator and the connector on the housing; and connecting an inner end of the a tape to the actuator with an integral retaining assembly.

In some constructions, inserting a connector includes engaging a plate portion of the connector with the housing, and connecting the connector may include engaging an arm of the connector with the actuator. In some constructions, connecting an inner end of the tape includes engaging a hook on one of the tape and the actuator with a barb on the other of the tape and the actuator.

In a further independent aspect, a method of assembling a cable snake may be provided. The method may generally include forming a housing defining a cavity and a passage communicating with the cavity; connecting a rotatable actuator to the housing; aligning a pocket in the actuator with the passage; after connecting, inserting an inner end of the a tape through the passage and into the pocket; connecting the inner end of the tape to the actuator with an integral retaining assembly; and winding the tape into the cavity.

Independent features and independent advantages of the invention may become apparent to those skilled in the art upon review of the detailed description, drawings and claims.

BRIEF DESCRIPTION OF THE DRAWINGS

FIG. 30 is a rear view of one housing half of the cable snake as shown in FIG. 1.

FIG. 31 is an inner view of a knob of the cable snake as shown in FIG. 1.

FIGS. 33A-33C are rear views of the cable snake as shown in FIG. 11 with the rear housing portion and the clip removed and illustrating assembly of the wire with the housing.

DETAILED DESCRIPTION

Figure 1:
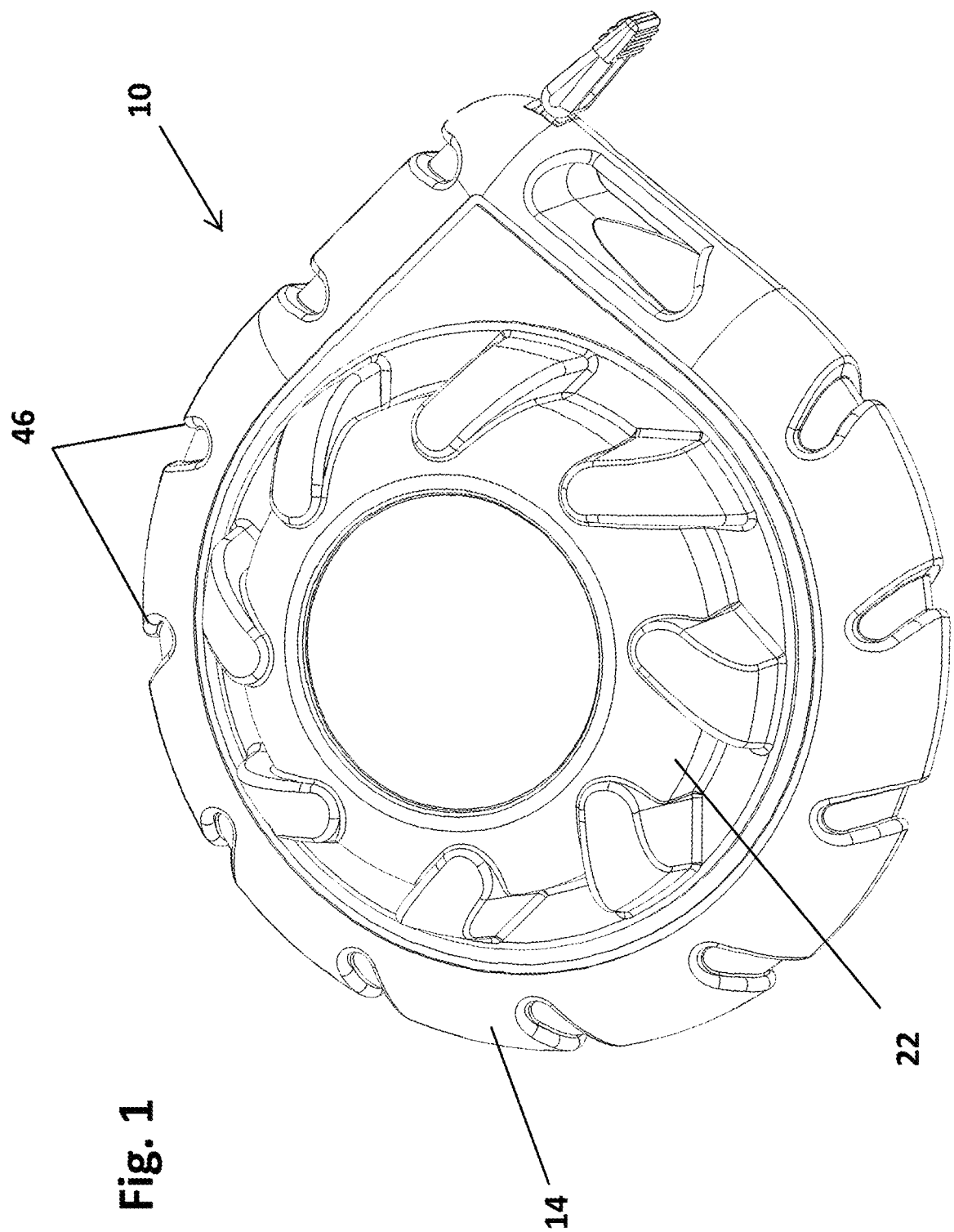
FIG. 1 is a front perspective view of a cable snake.
Figure 2:
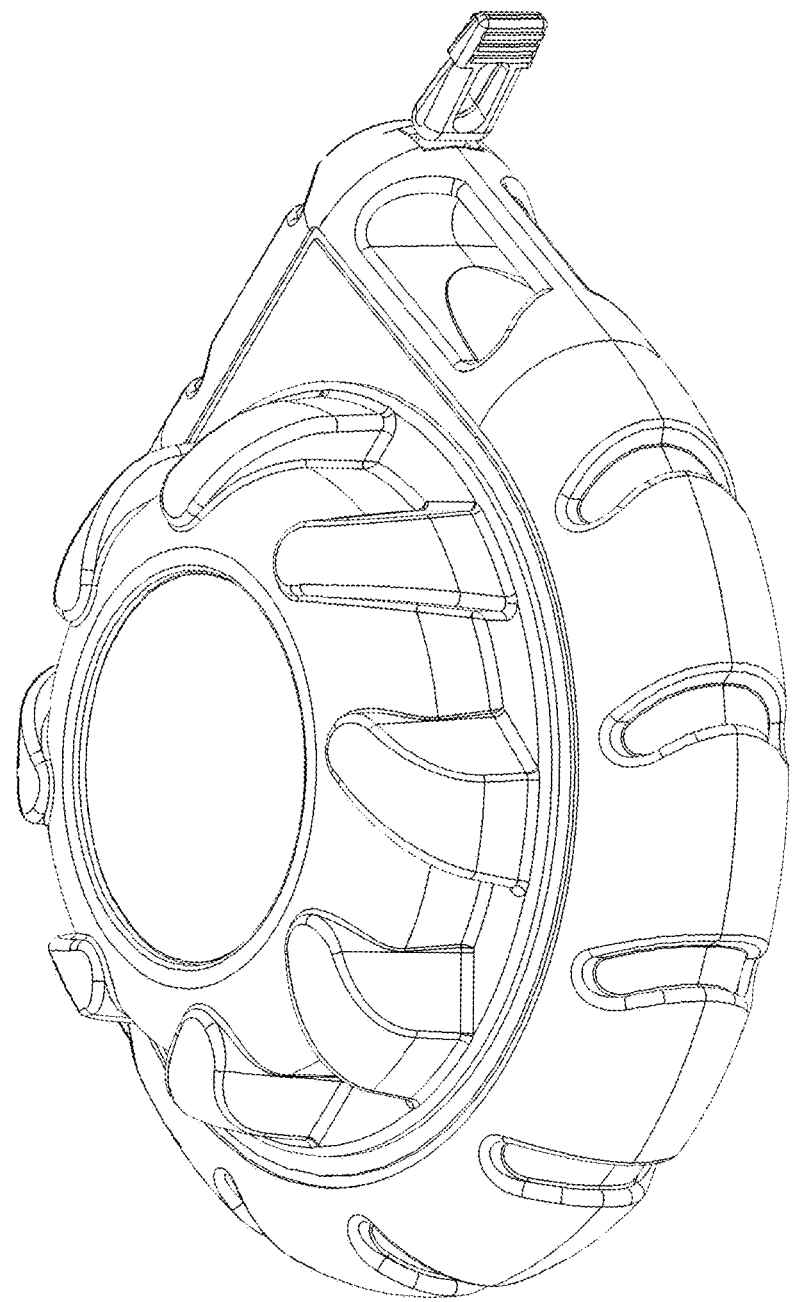
FIG. 2 is another front perspective view of the cable snake shown in FIG. 1.
Figure 3:
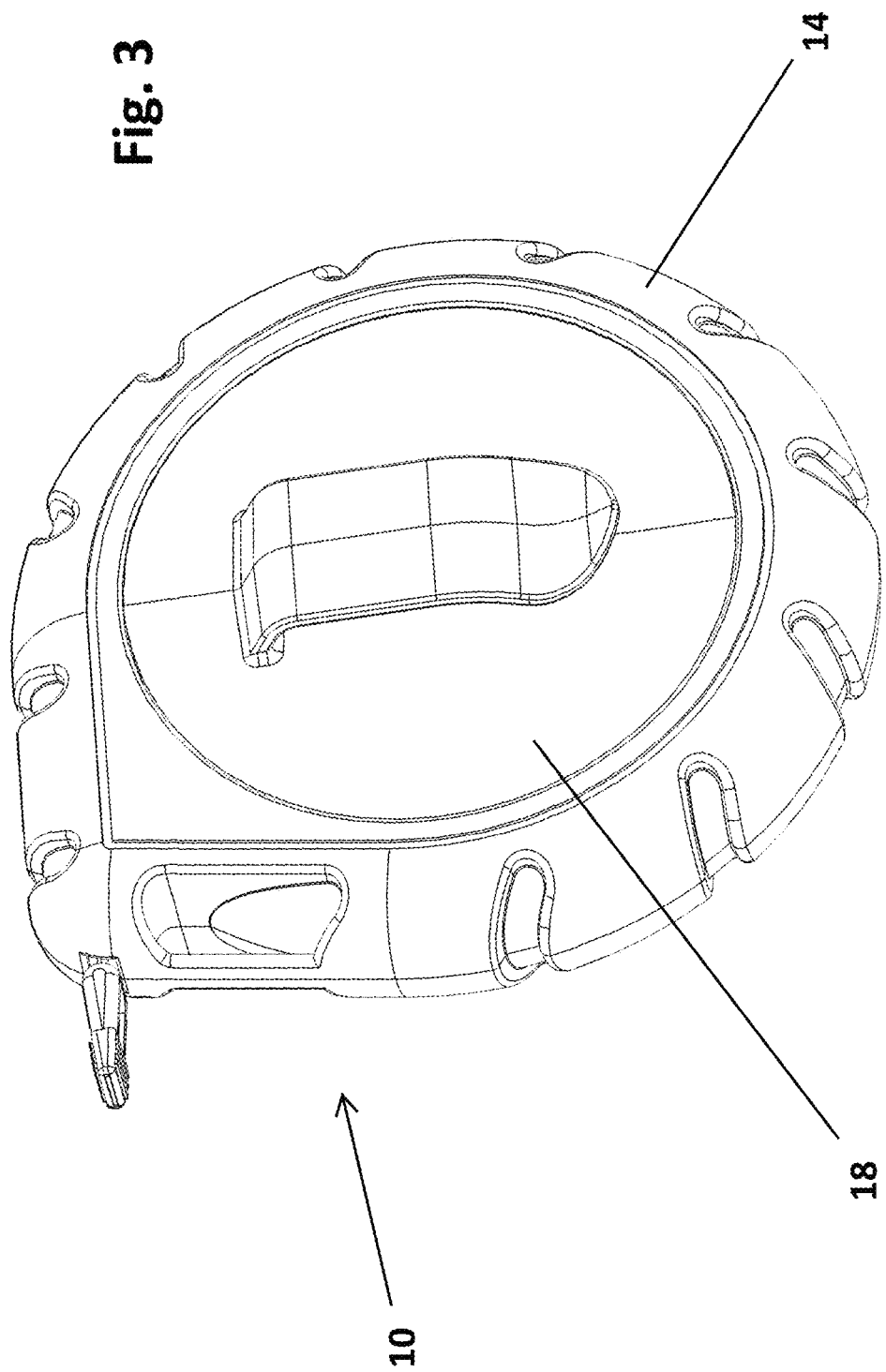
FIG. 3 is a rear perspective view of the cable snake shown in FIG. 1.
Figure 4:
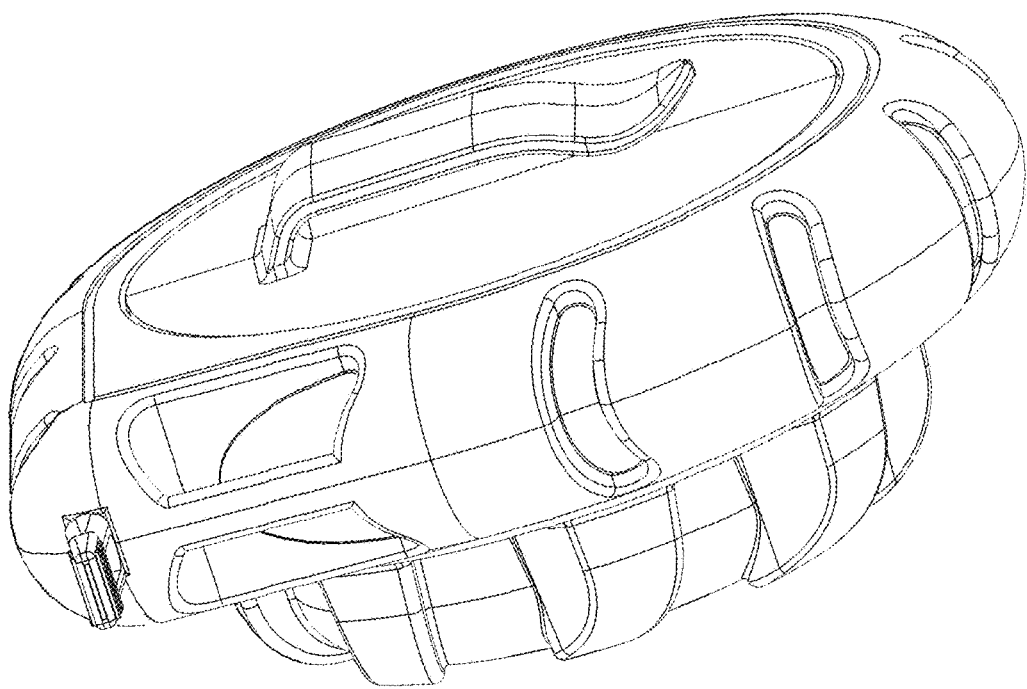
FIG. 4 is another rear perspective view of the cable snake shown in FIG. 1.
Figure 5:
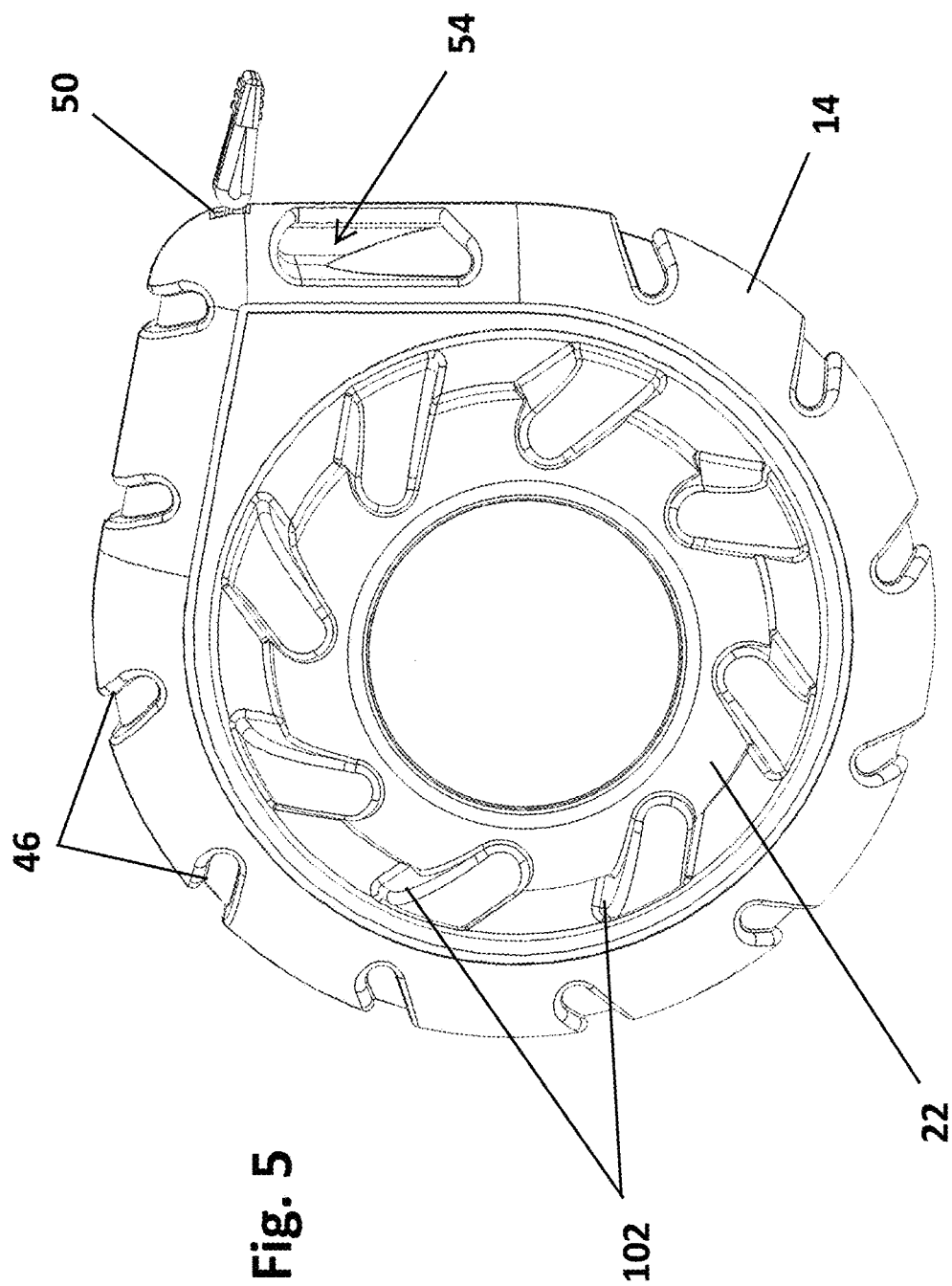
FIG. 5 is a front view of the cable snake shown in FIG. 1.
Figure 6:
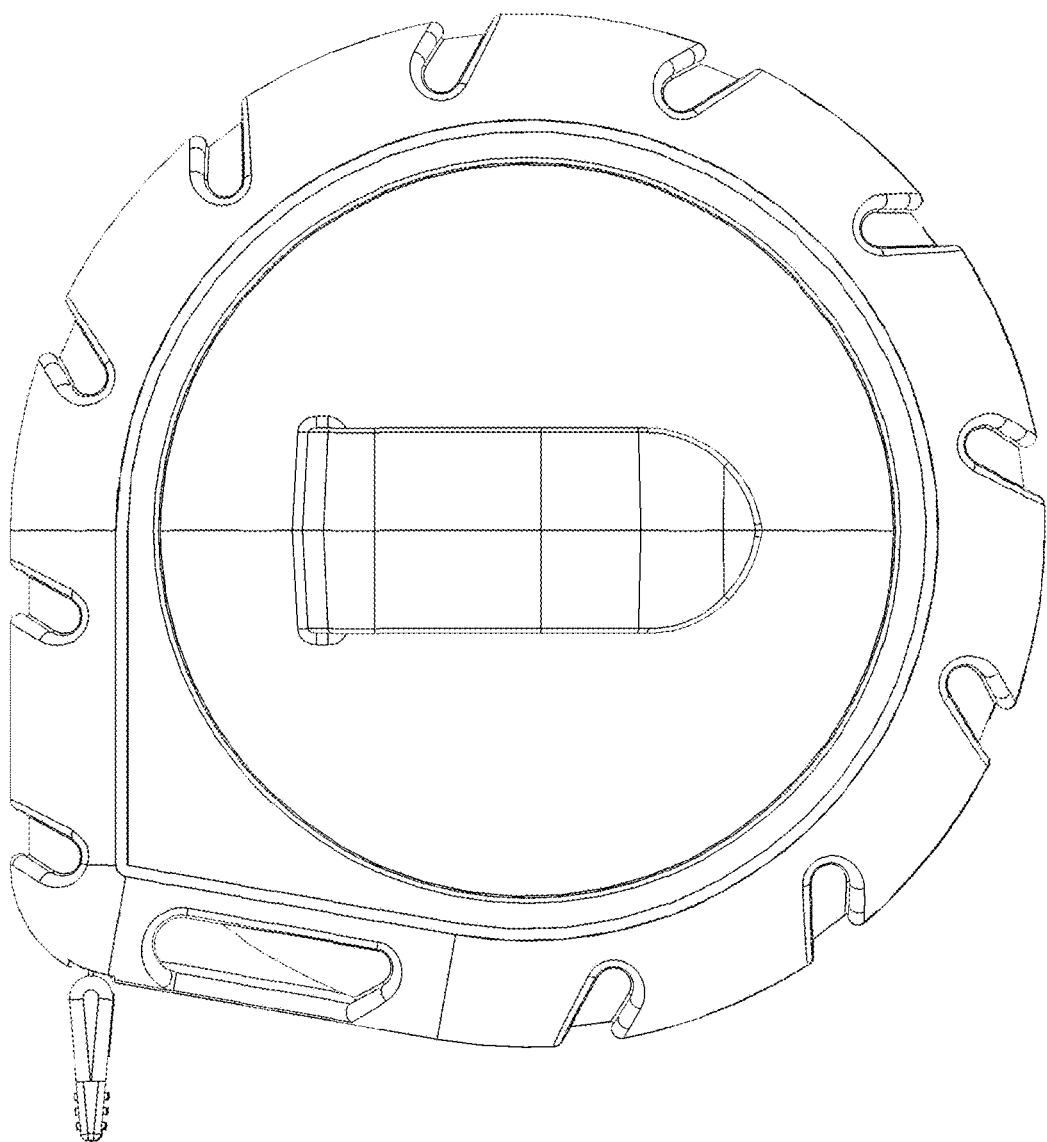
FIG. 6 is a rear view of the cable snake shown in FIG. 1.
Figure 7:
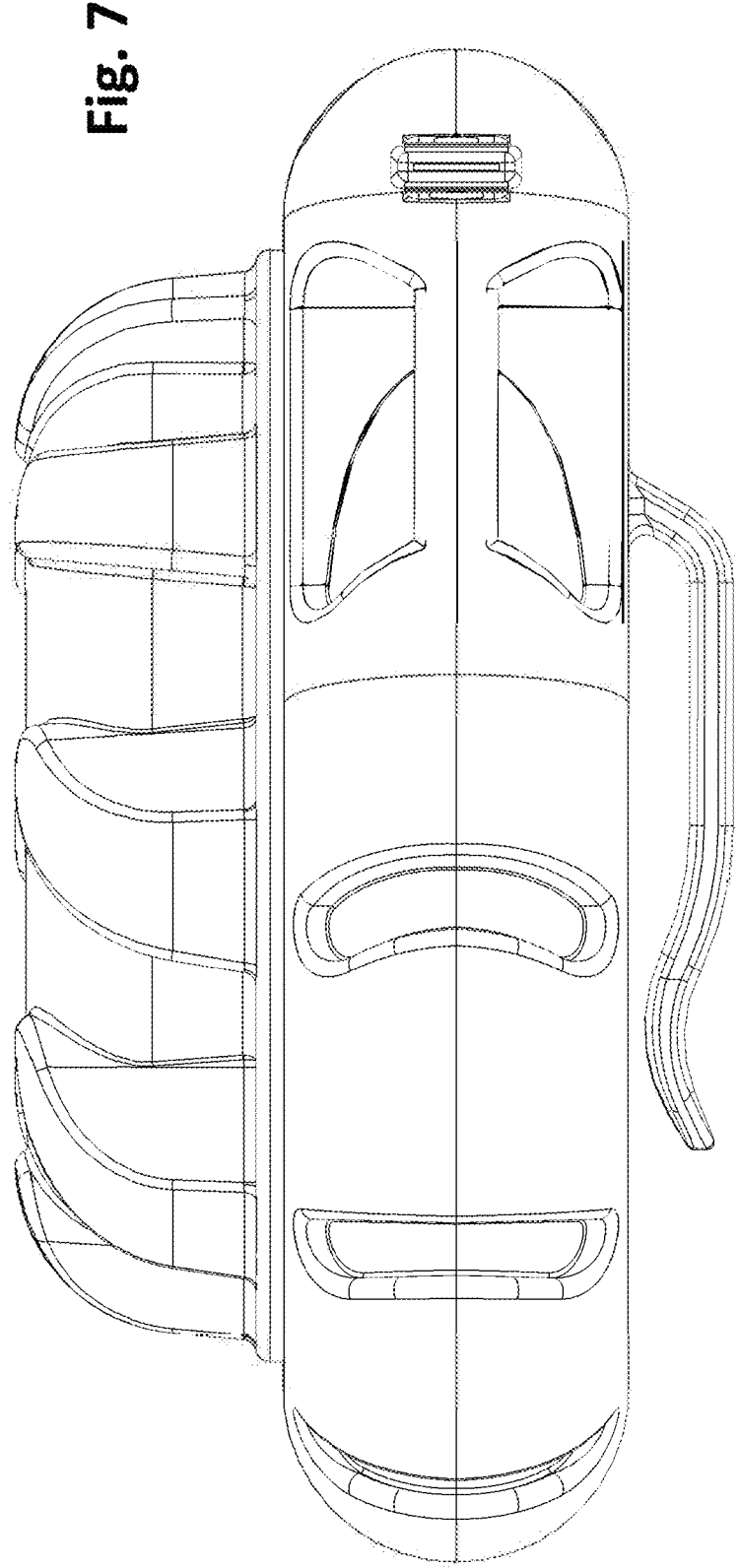
FIG. 7 is a right side view of the cable snake shown in FIG. 1.
Figure 8:
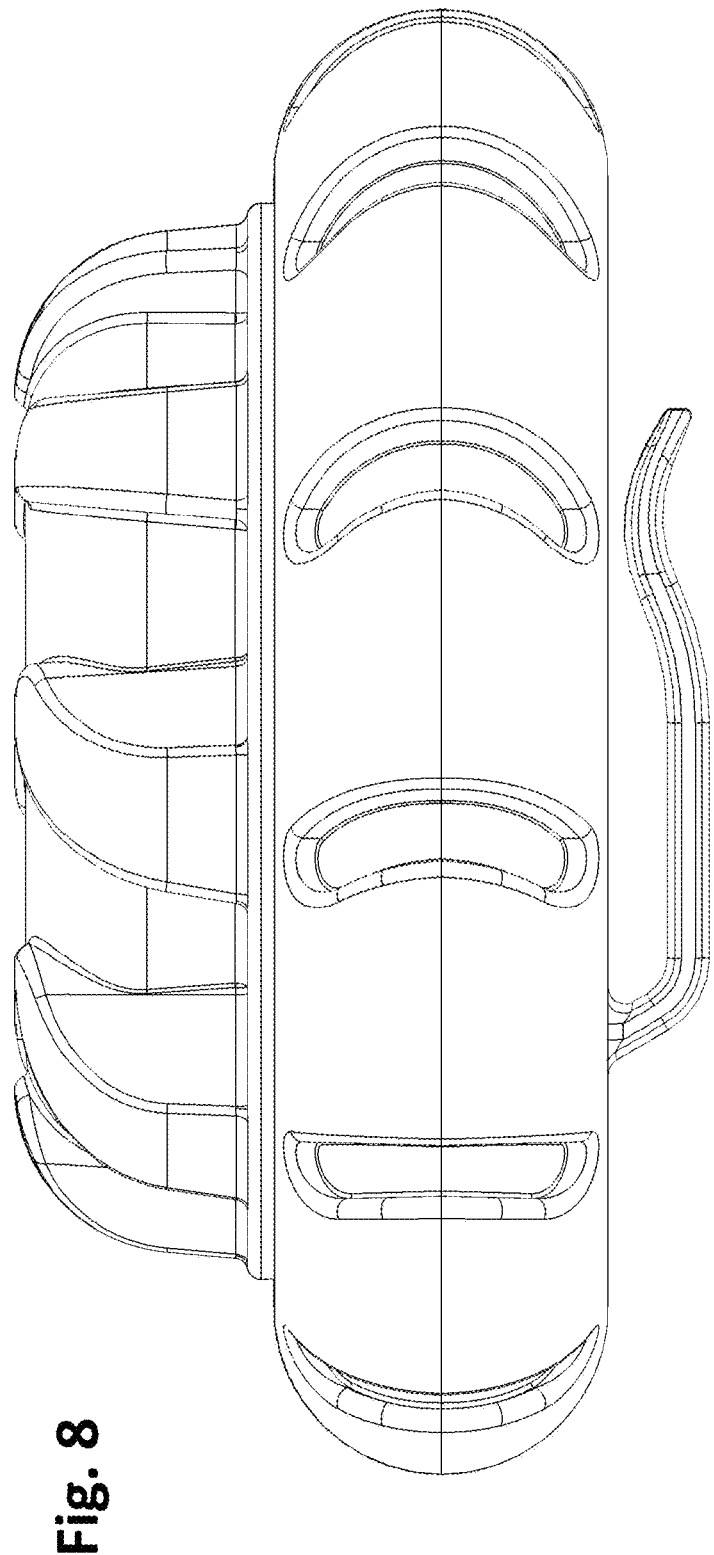
FIG. 8 is a left side view of the cable snake shown in FIG. 1.
Figure 9:
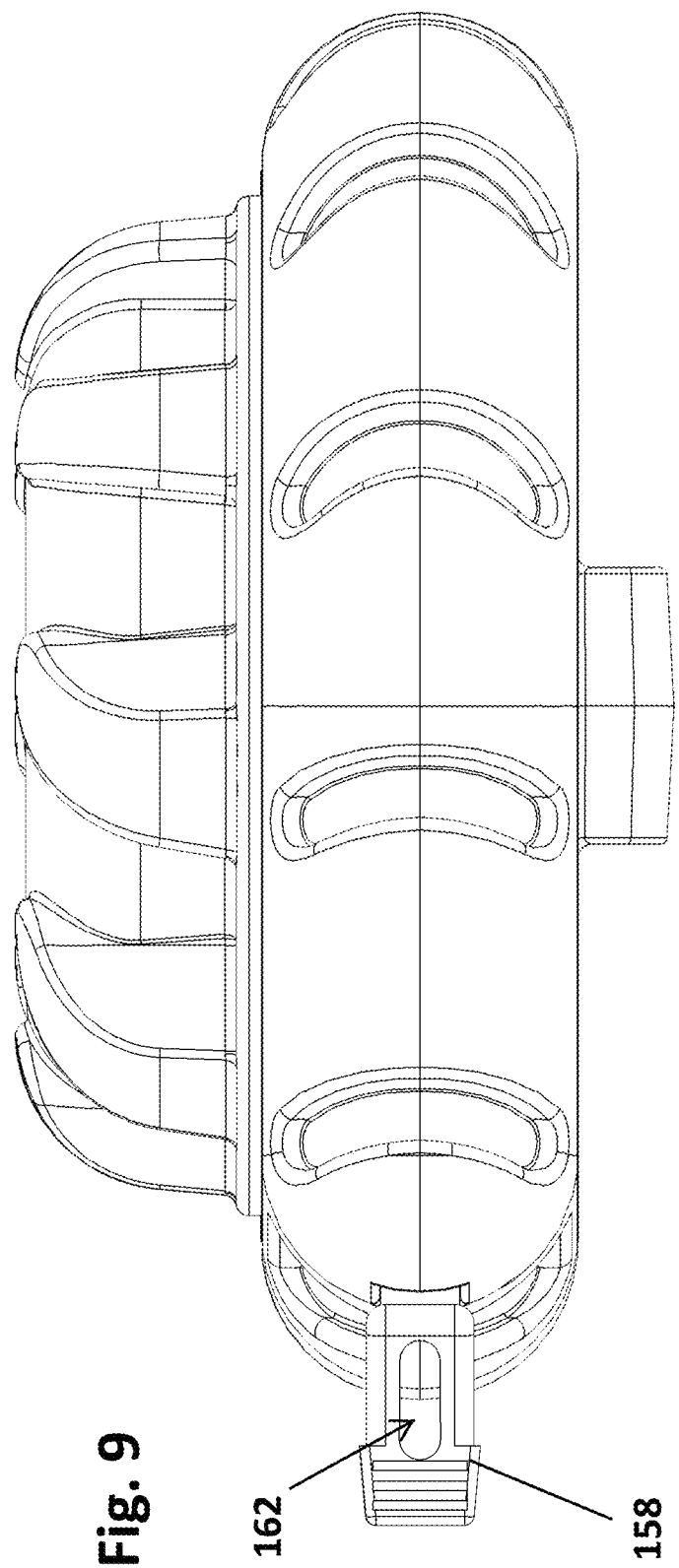
FIG. 9 is a top view of the cable snake shown in FIG. 1.
Figure 10:
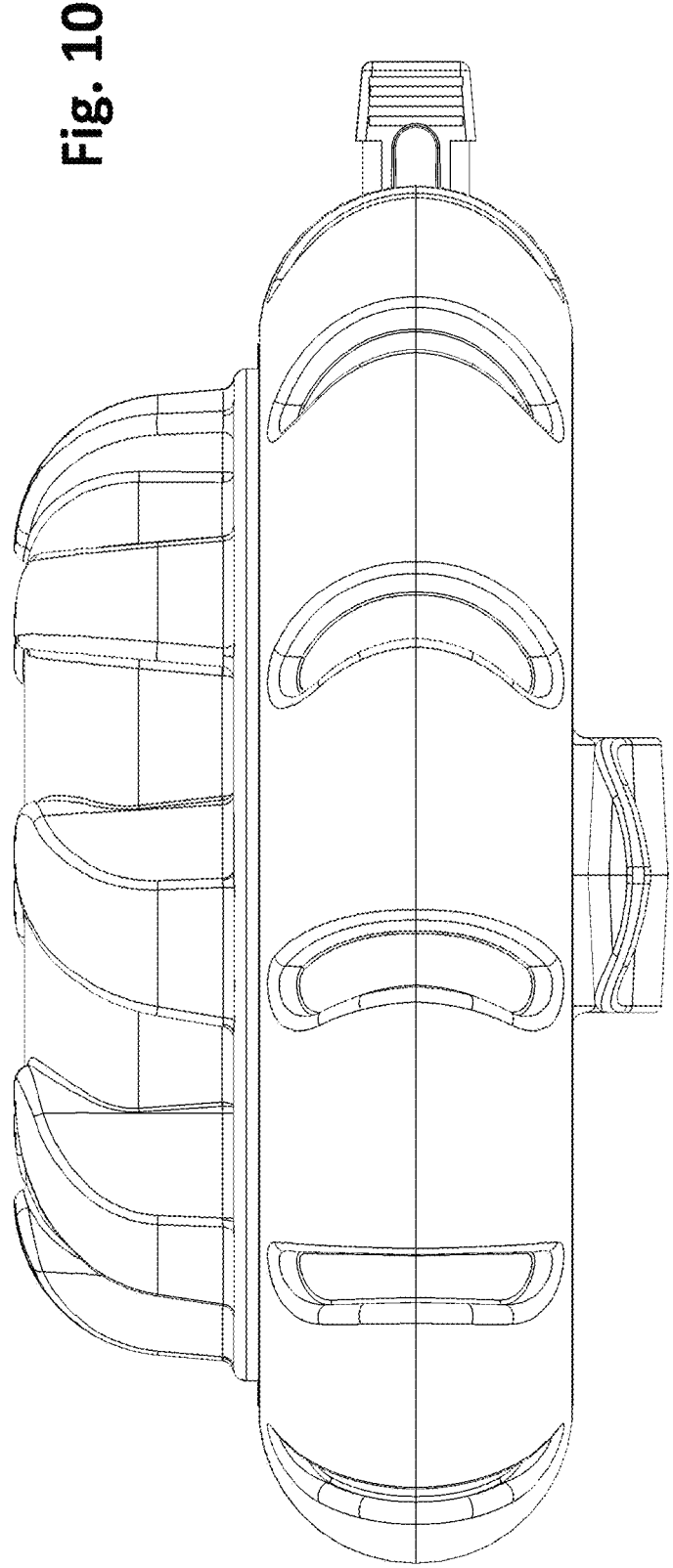
FIG. 10 is a bottom view of the cable snake shown in FIG. 1.
Figure 11:
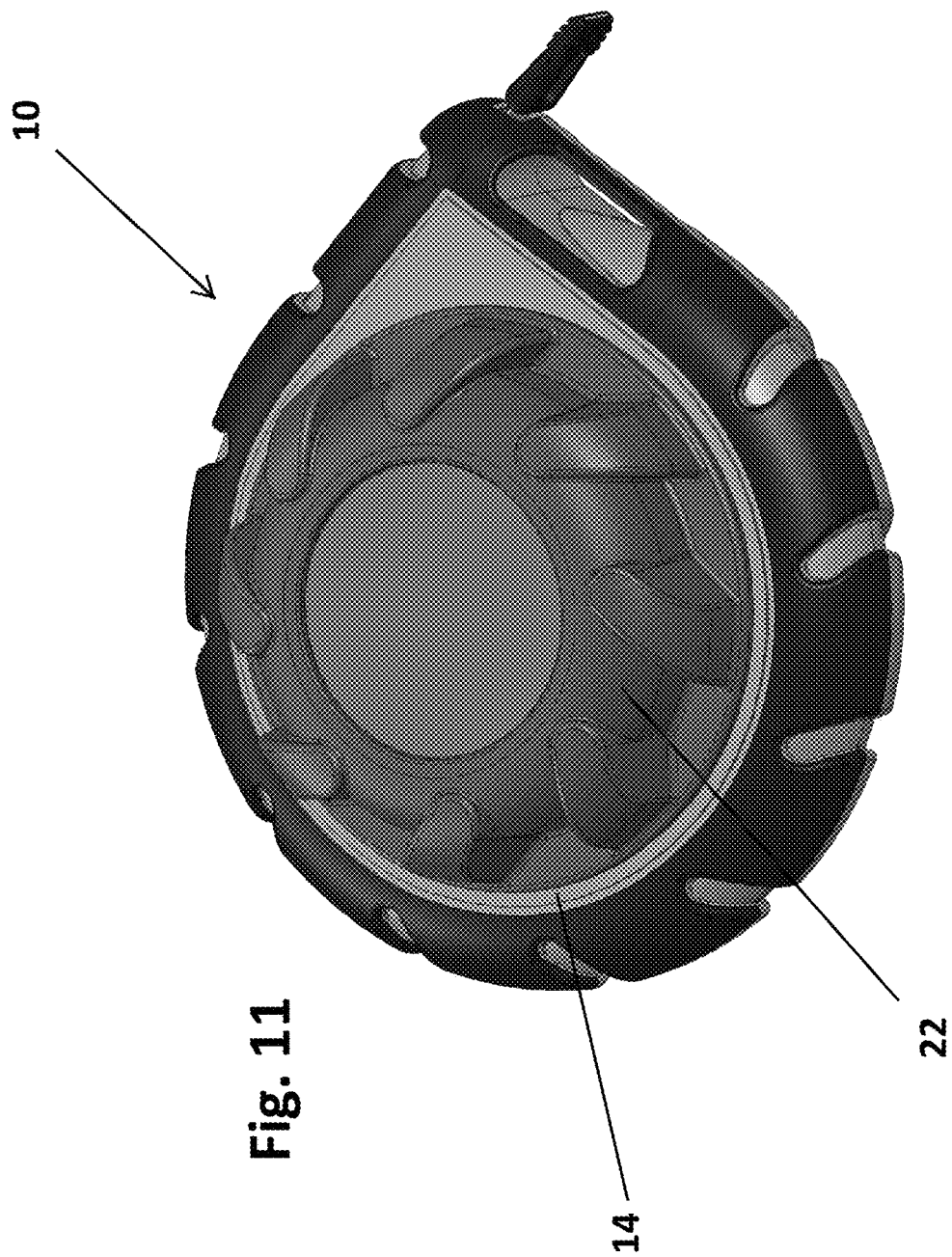
FIG. 11 is a front perspective view of the cable snake shown in FIG. 1 in color.
Figure 12:
FIG. 12 is another front perspective view of the cable snake as shown in FIG. 11.
Figure 13:
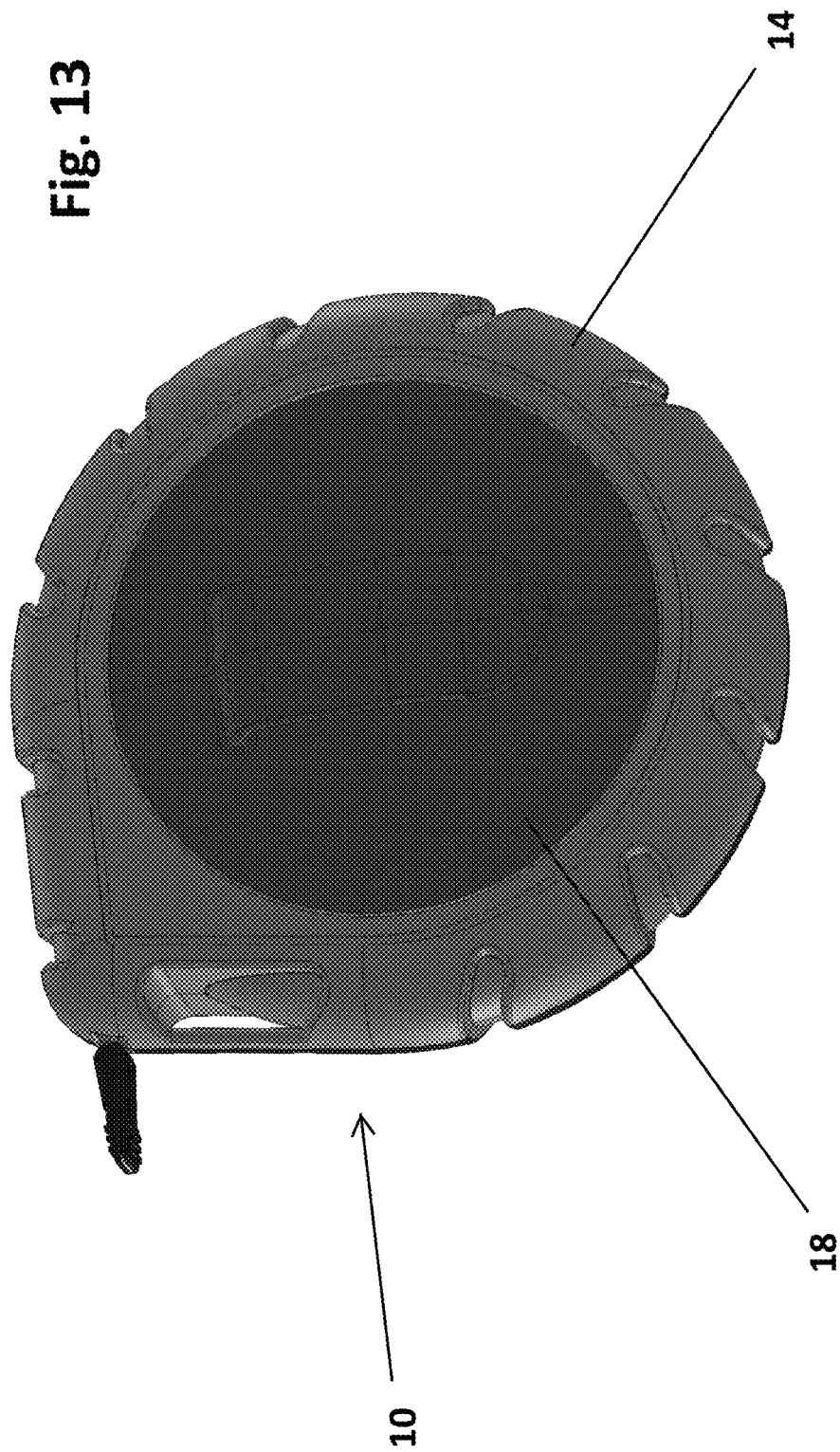
FIG. 13 is a rear perspective view of the cable snake as shown in FIG. 11.
Figure 14:
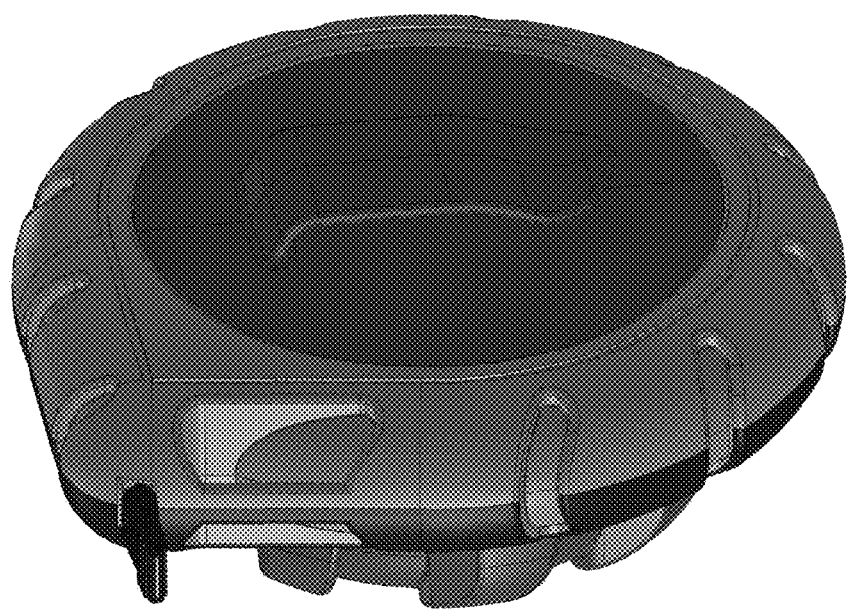
FIG. 14 is another rear perspective view of the cable snake as shown in FIG. 11.
Figure 15:
FIG. 15 is a front view of the cable snake as shown in FIG. 11.
Figure 16:
FIG. 16 is a rear view of the cable snake as shown in FIG. 11.
Figure 17:
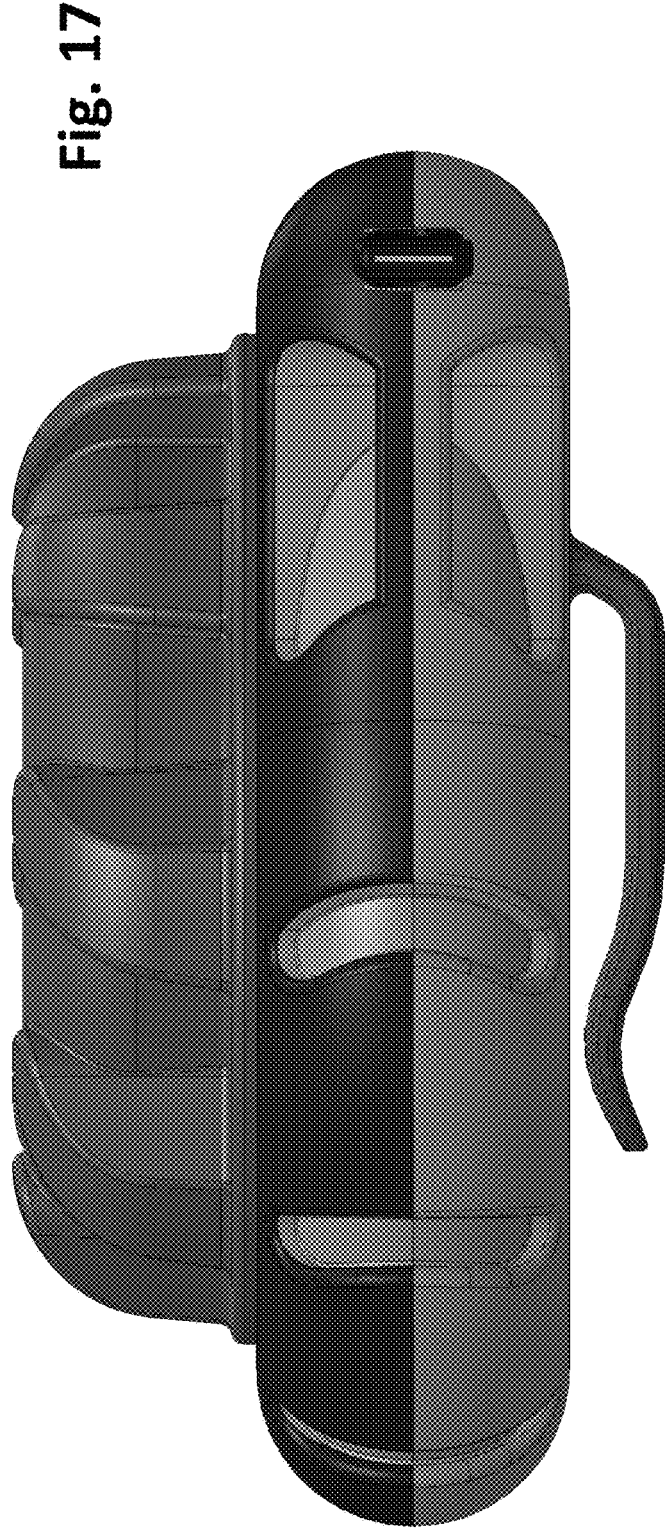
FIG. 17 is a right side view of the cable snake as shown in FIG. 11.
Figure 18:
FIG. 18 is a left side view of the cable snake as shown in FIG. 11.
Figure 19:
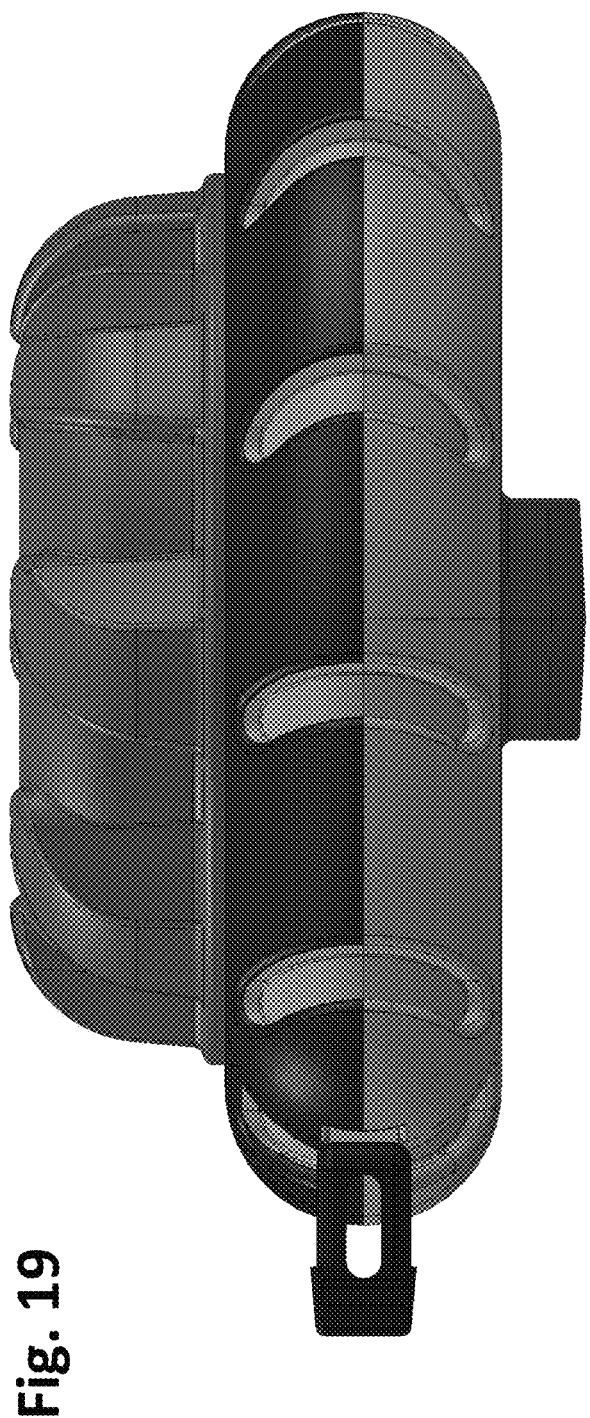
FIG. 19 is a top view of the cable snake as shown in FIG. 11.
Figure 20:
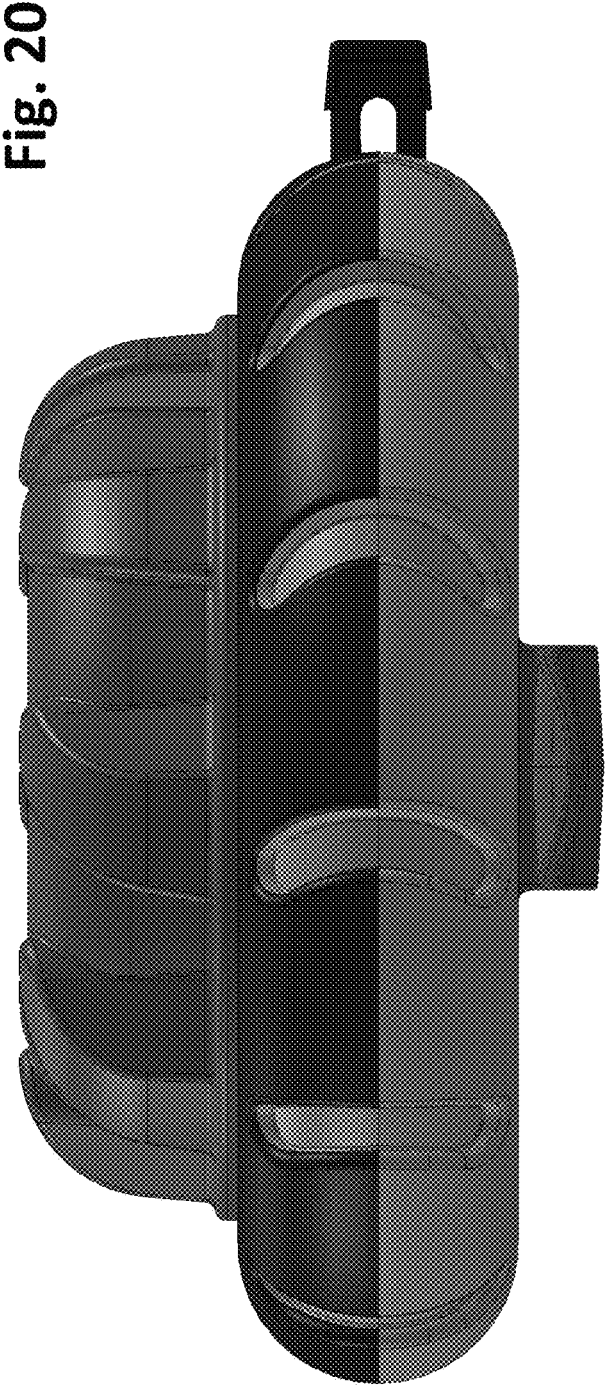
FIG. 20 is a bottom view of the cable snake as shown in FIG. 11.
Figure 21:
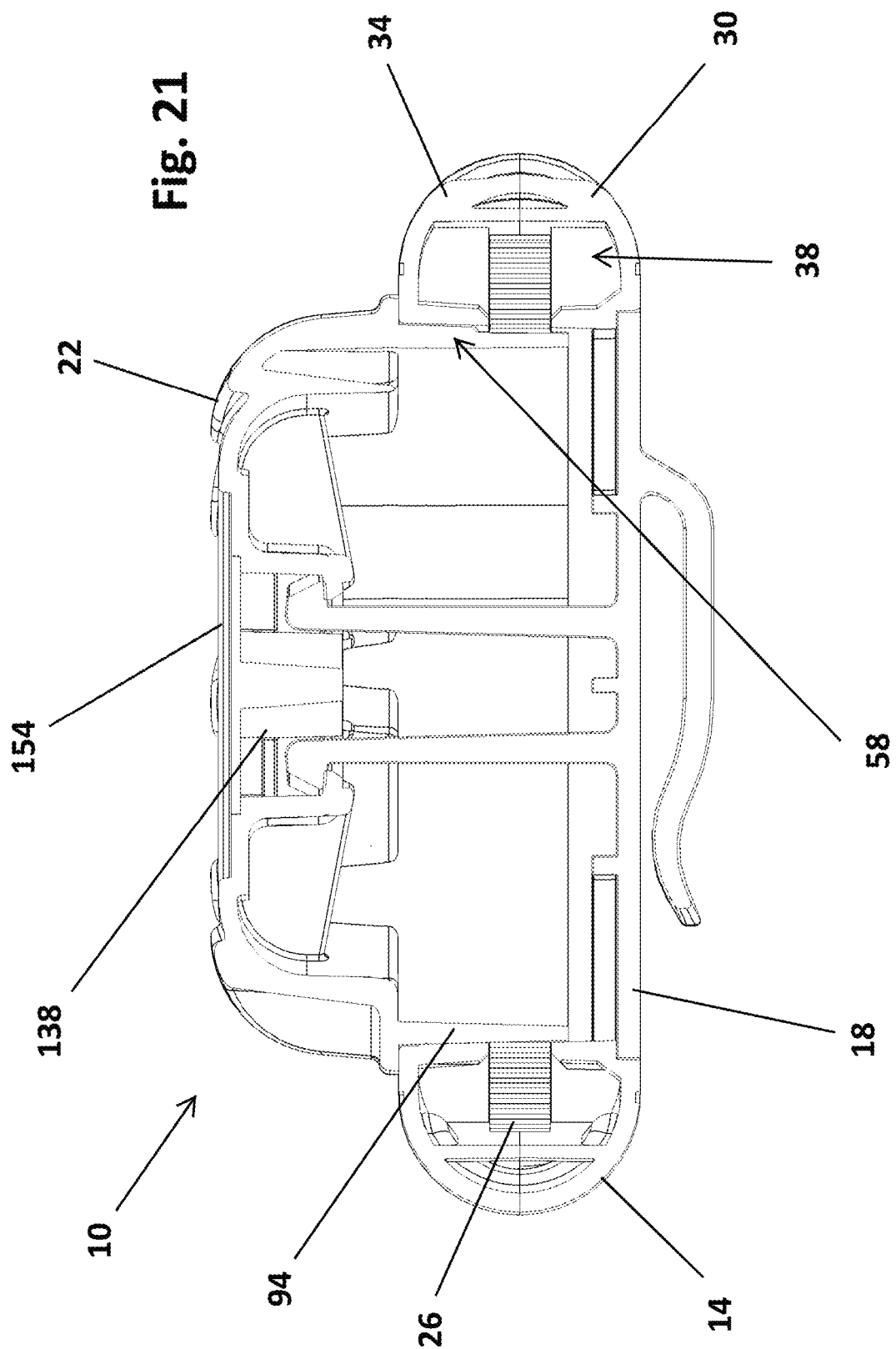
FIG. 21 is a right side cross-sectional view of the cable snake as shown in FIG. 1.
Figure 22:
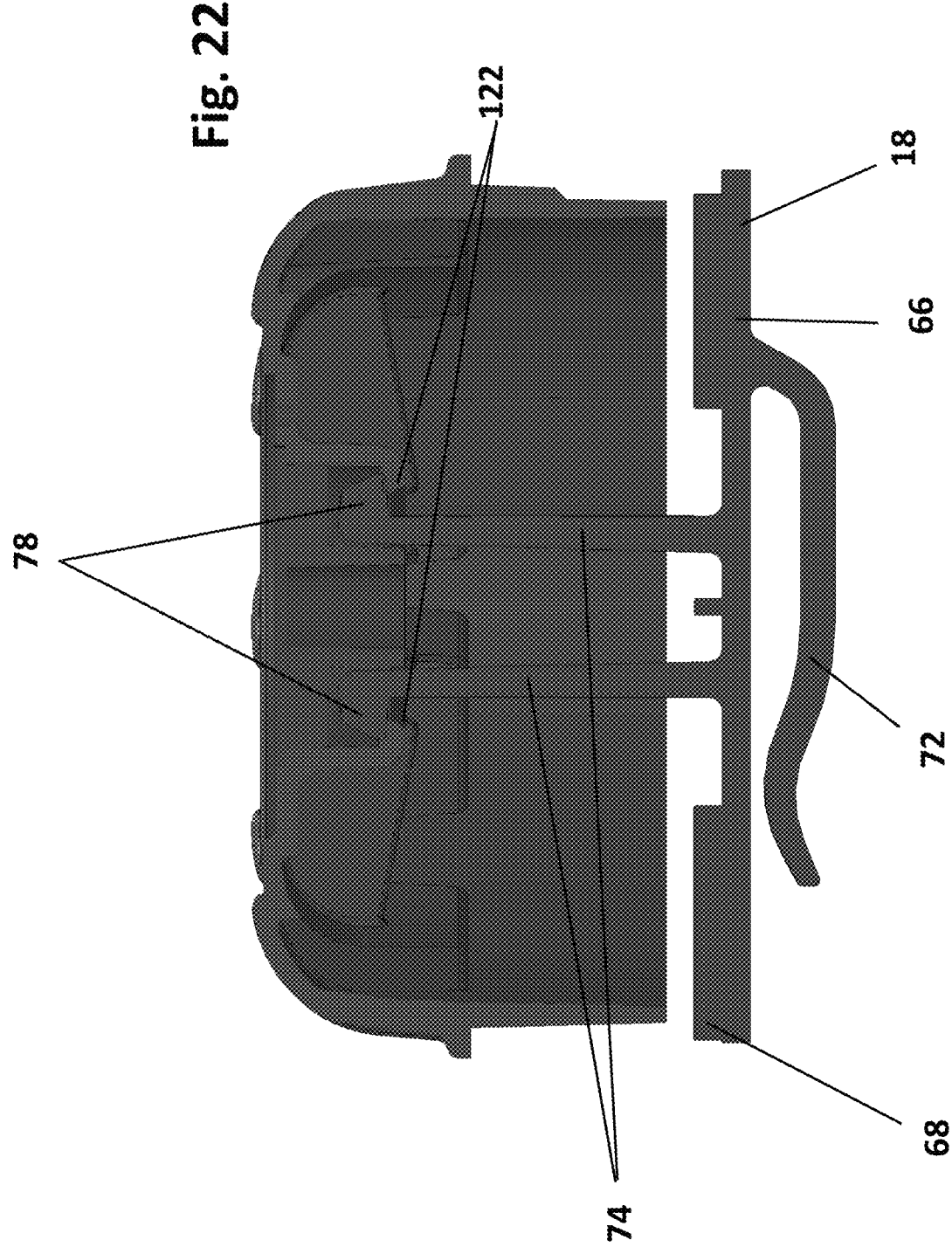
FIG. 22 is a right side cross-sectional view of the cable snake as shown in FIG. 11 with the housing removed.
Figure 23:
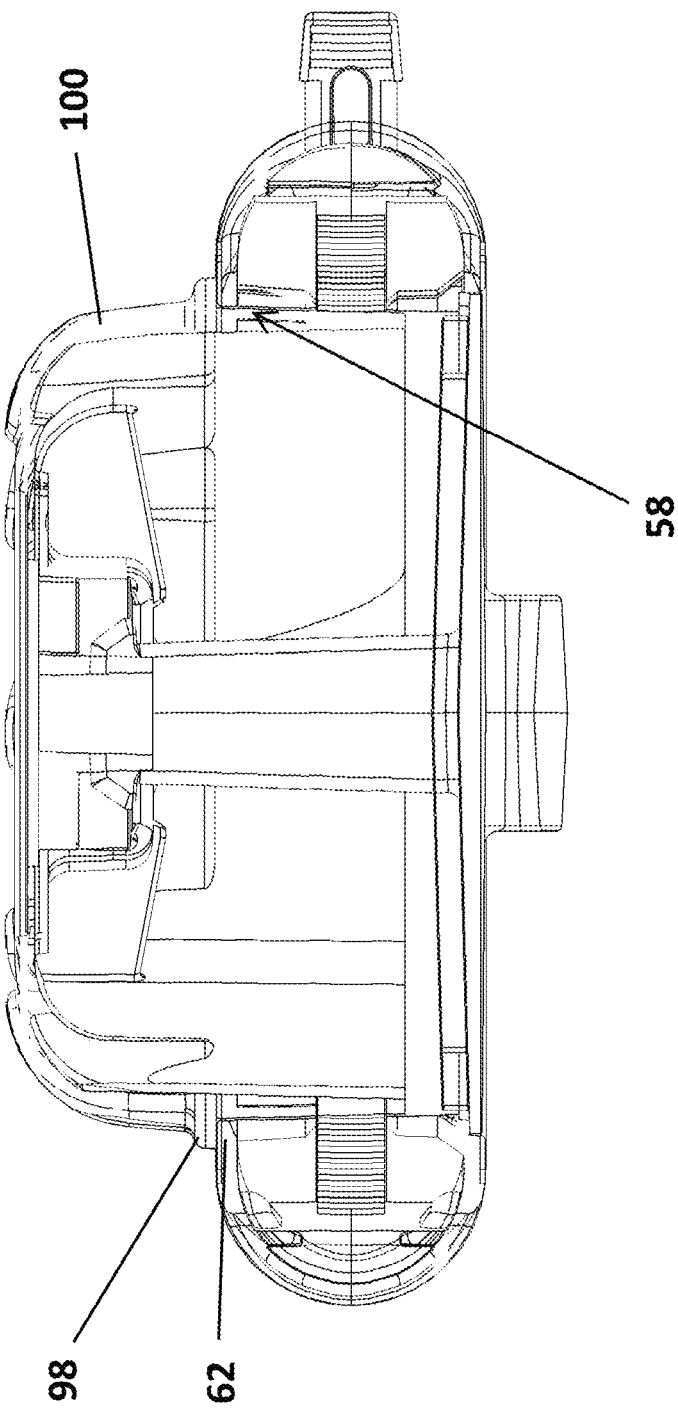
FIG. 23 is a bottom cross-sectional view of the cable snake as shown in FIG. 1.
Figure 24:
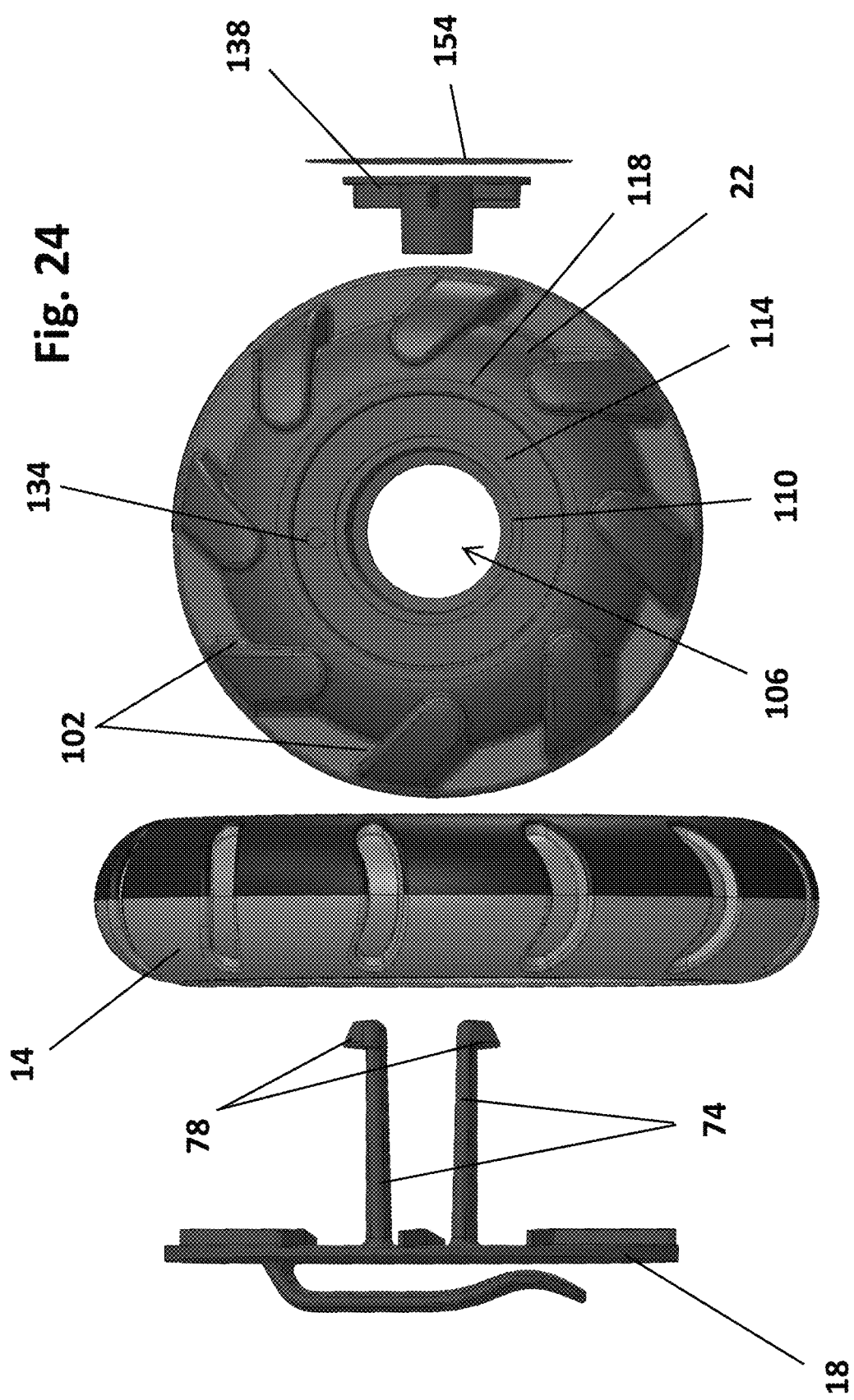
FIG. 24 is a partially exploded view of the cable snake as shown in FIG. 11.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Unless specified or limited otherwise, the terms "mounted," "connected," "supported," and "coupled" and variations thereof are used broadly and encompass both direct and indirect relationships (e.g., mountings, connections, supports, couplings, etc.). Use of "consisting of" and variations thereof as used herein is meant to encompass only the items listed thereafter and equivalents thereof.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use, etc.) associated with the particular value, etc.).

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

FIGS. 1-34 illustrate a cable snake 10, for example, used in the installation of electrical wiring, cables, etc., in structures. The cable snake 10 generally includes a housing assembly 14, a back cover 18, a knob 22 and a tape 26. The illustrated cable snake 10 is assembled without fasteners, including in the connection of the tape 26 to the knob 22. Interference between components of the cable snake 10 (e.g., between the housing assembly 14 and the knob 22) may counter or inhibit the "clockspring" effect from the tape 26.

The housing assembly 14 includes housing halves 30, 34 connected to define a cavity 38 to receive the wound tape 26. Bosses 42 with complementary projections and recesses connect the housing halves 30, 34.

On its outer surface, the housing assembly 14 provides gripping portions 46 formed by raised surfaces and grooves. Alternatively or additionally, the surface of the housing assembly 14 (e.g., gripping portions 46) may include material to improve grip (e.g., elastomeric material) and/or surface treatments.

A passage 50 communicates with the cavity 38 to allow the tape 26 to be dispensed from or wound into the cavity 38. An opening 54 for an optional lanyard or wrist strap (not shown) is defined proximate the passage 50 and the periphery of the housing assembly 14. The housing assembly 14 defines a central opening 58 having a rim 62.

The back cover 18 includes a disc-shaped body 66 engaging the back housing half 30. A rib 68 on the body 66 engages a notch 70 on the back housing half 30 to rotationally fix the cover 18 and the housing half 30. Additional ribs 68 strengthen the body 66 so that sufficient force can be applied between the knob 22 and the housing assembly 14 counter or inhibit the "clockspring" effect from the tape 26, as described below in more detail. A belt clip 72 is on the outer side of the cover 18. Arms 74 extend into the central opening 58. A projection 78 is provided on the free end of each arm 74. Each projection has (see FIG. 32A) a radial surface 82, a ramp surface 86 and an inner surface 90.

The knob 22 is supported for rotation relative to the housing assembly 14 and includes a body 94 extending into the opening 58. An outer annular ridge 98 engages the rim 62 of the front housing half 34.

An actuator portion 100 extends from the housing assembly 14 and includes gripping portions 102 formed by raised surfaces and grooves. In the illustrated construction, the gripping portions 102 (and the gripping portions 46) are arranged to facilitate winding of the tape 26 (e.g., angled in opposite directions to promote counterclockwise rotation in FIG. 5). Alternatively or additionally, the surface of the knob 22 (e.g., gripping portions 102) may include material to improve grip (e.g., elastomeric material) and/or surface treatments.

Figure 32B:
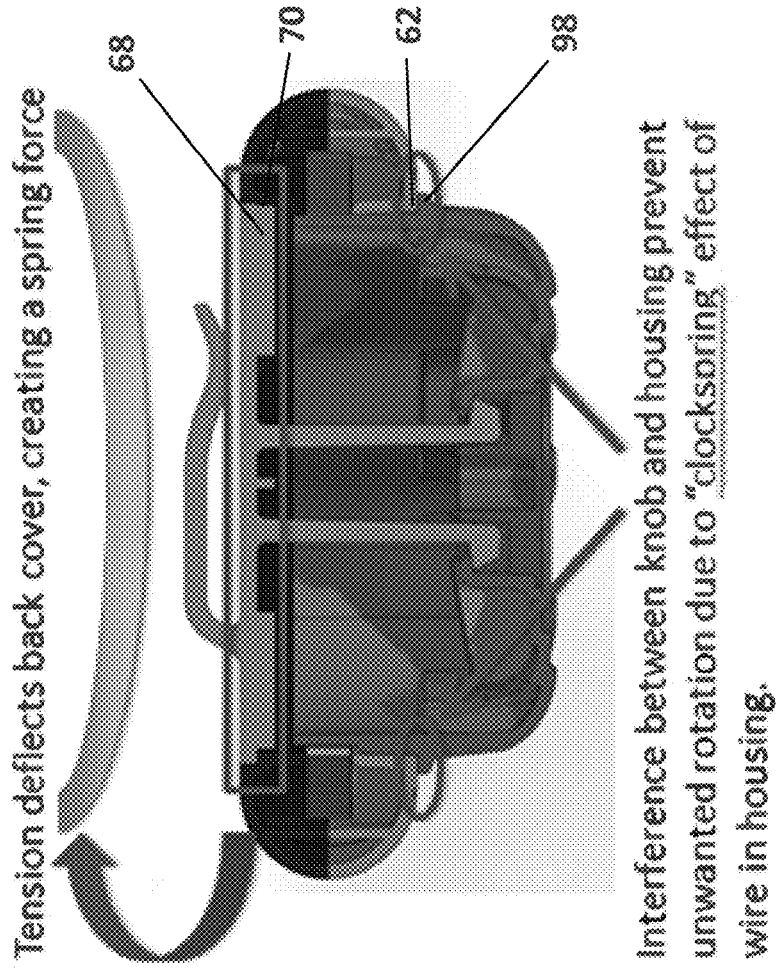
FIGS. 32A-32B are cross-sectional views of the cable snake as shown in FIG. 11 illustrating interference between the knob and the housing.
Figure 32A:
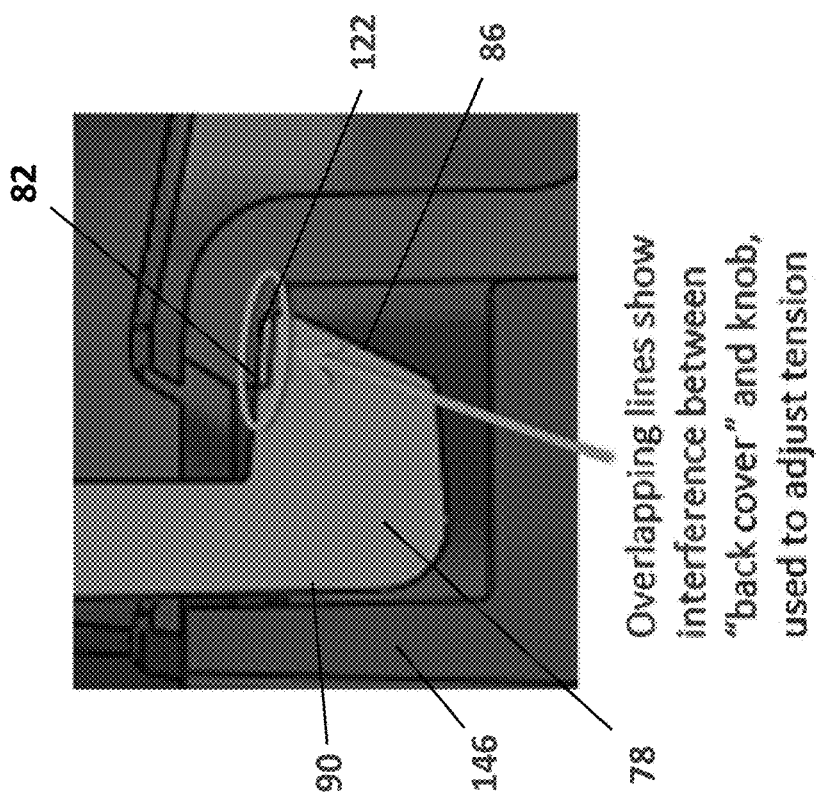
Figure 34:
FIG. 34 is a front perspective view of another alternative construction of a cable snake.

The knob 22 defines (see FIG. 24) a central opening 106. The knob 22 is stepped from the opening 106 with an inner annular shelf 110, an intermediate annular shelf 114, and its outer surface 118. An inner annular ridge 122 extends into the opening 106. As discussed below in more detail and as shown in FIGS. 32A-32B, the radial surface 82 of each projection 78 engages the ridge 122 to connect the cover 18 and the knob 22.

Figure 25:
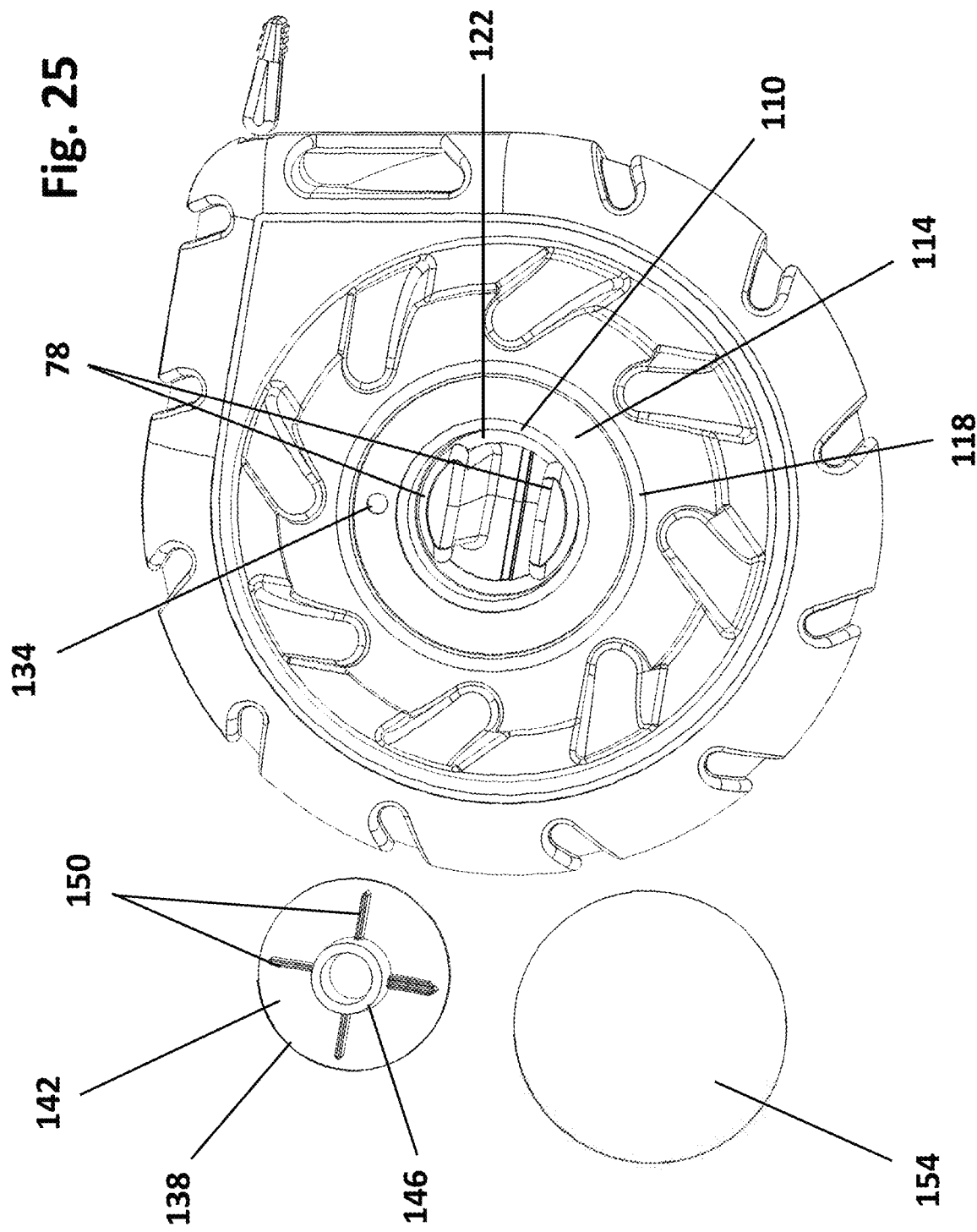
FIG. 25 is a front view of the cable snake as shown in FIG. 1 with the plug and label removed.
Figure 26:
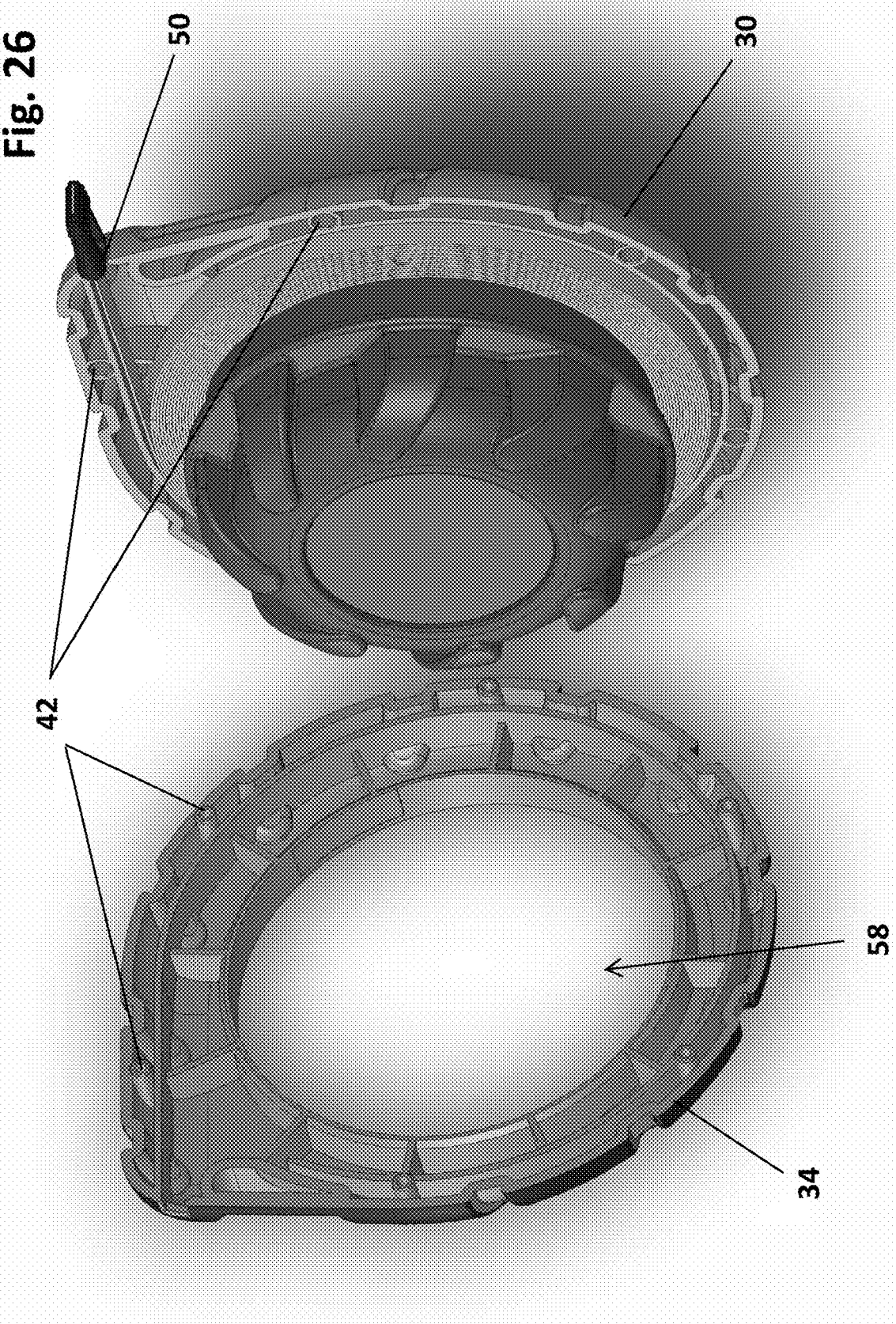
FIG. 26 is a perspective view of the cable snake as shown in FIG. 11 with a housing half removed.
Figure 27:
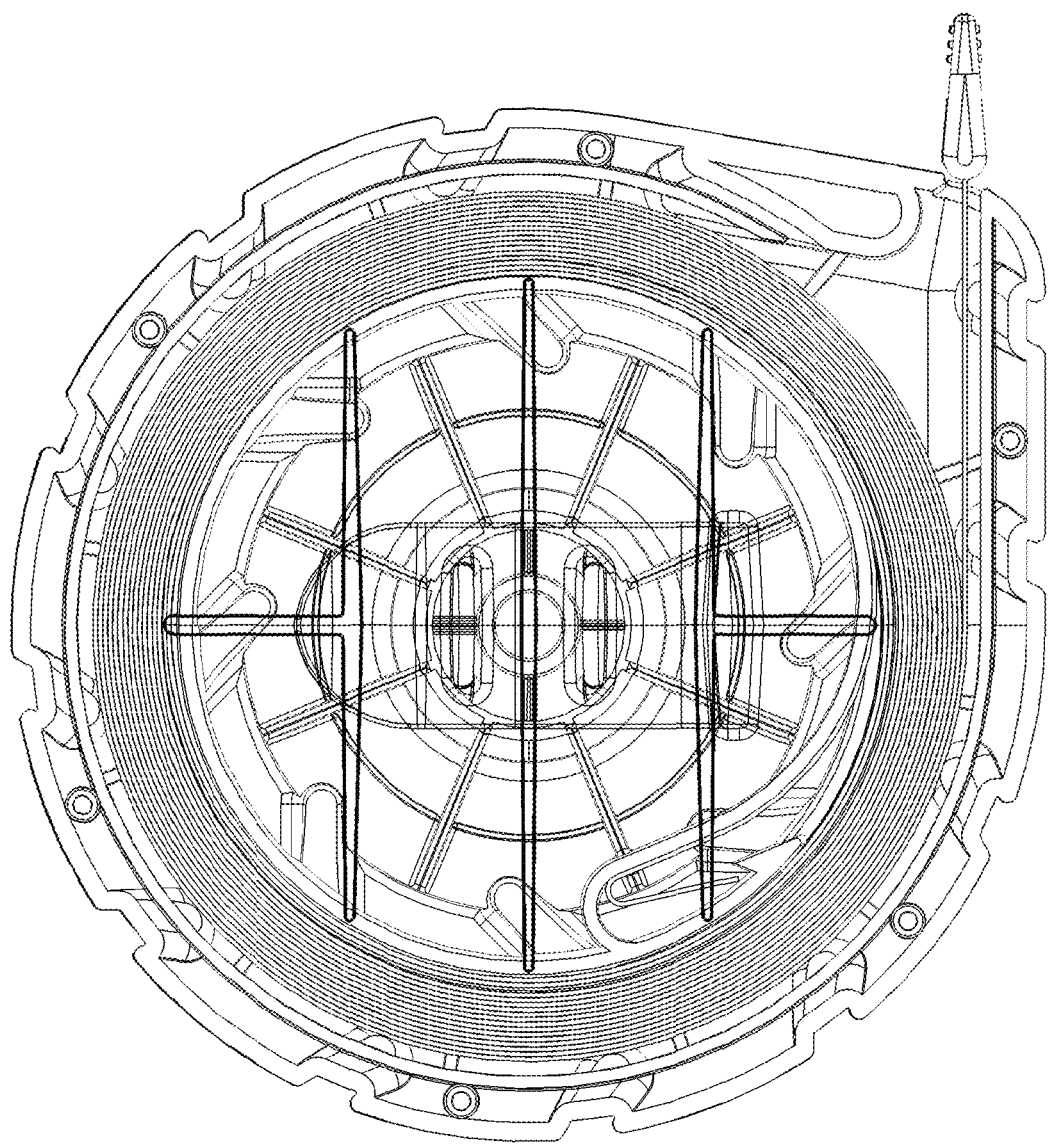
FIG. 27 is a rear view of the cable snake as shown in FIG. 1 with the back housing portion removed and the clip portion shown as transparent.
Figure 28:
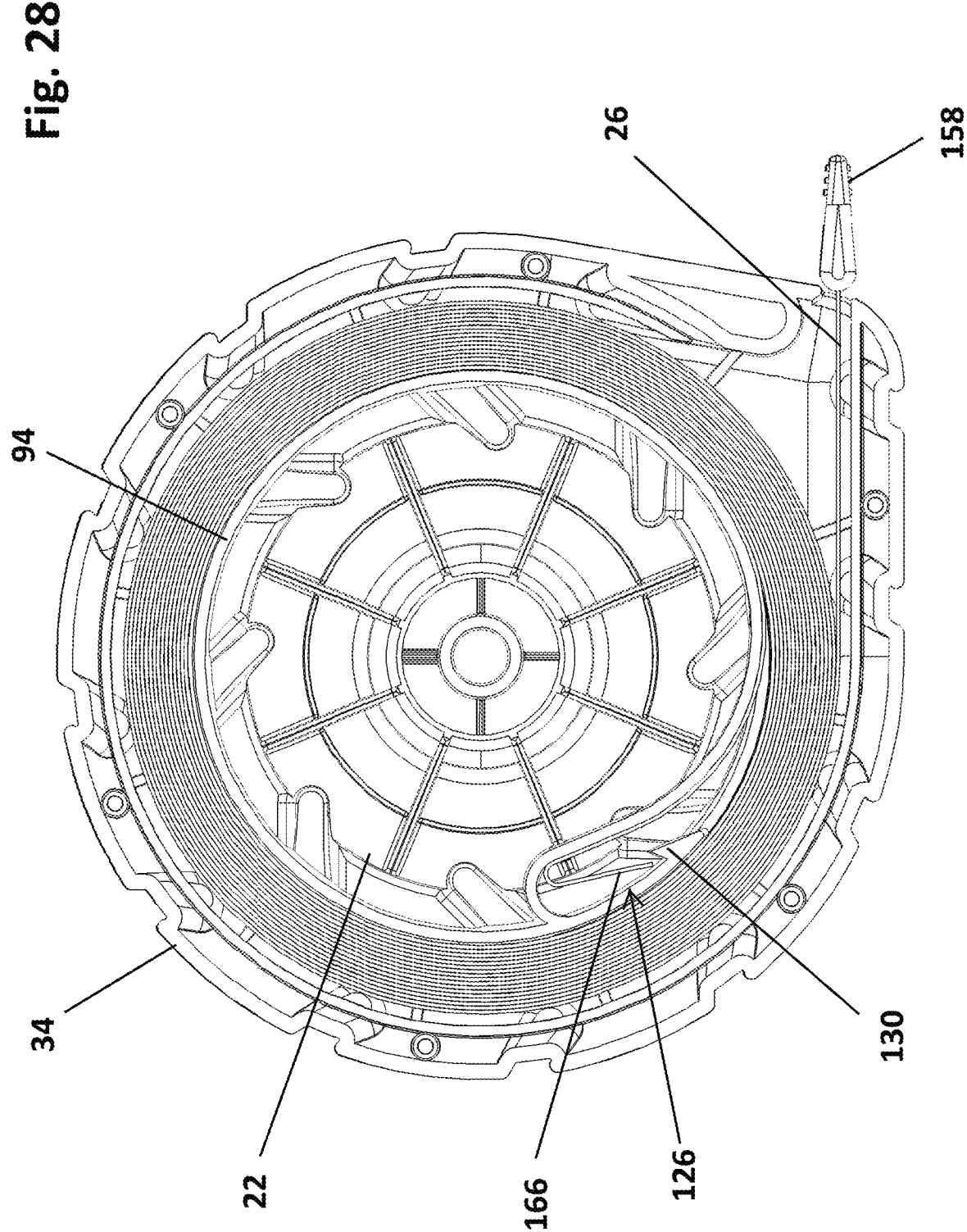
FIG. 28 is a rear cross-sectional view of the cable snake as shown in FIG. 1.
Figure 29:
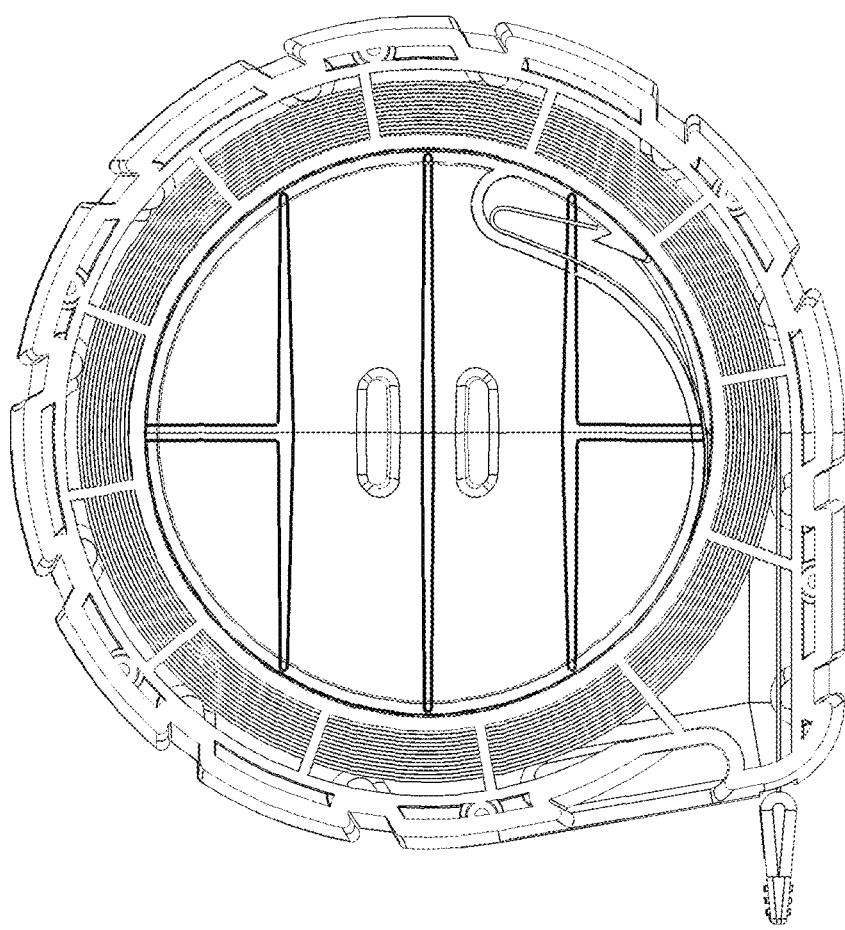
FIG. 29 is a front cross-sectional view of the cable snake as shown in FIG. 1.

The body 94 cooperates with the housing assembly 14 to define the annular cavity 38. The body 94 defines (see FIG. 28) a pocket 126 with a barb 130. As shown in FIG. 25, an indicator 134 on the front surface of the knob 22 (e.g., on the shelf 114) aligns the pocket 126 with the passage 50 to, as discussed below, facilitate insertion of the tape 26.

A plug 138 is positionable in the opening 106. The plug 138 includes a plate 142 covering the opening 106. The plate 142 has an outer portion engageable with the shelf 110 substantially flush with the shelf 114. A projection 146 extends into the opening 106 and is engageable with the inner surface 90 of each projection 78. Ribs 150 (e.g., at least at the tips) provide an interference fit with and center the plug 138 in the opening 106.

A label 154 covers the plug 138. The label 154 is engageable with the outer surface of the plate 142 and with the shelf 114 and to be substantially flush with the outer surface 114. The label 154 includes adhesive to secure the label 154 and the plug 138 in position.

The tape 26 has a tip 158 with an opening 162 for receiving and retaining a wire to be fished. At its inner end, the tape 26 has a hook 166 received into the pocket 126 and retained by the barb 130, as discussed below, to provide an integral retainer assembly.

To assemble the cable snake 10, the housing halves 30, 34 are connected with the bosses 42 engaged. The cover 18 and the knob 22 are installed with the arms 74 and body 94, respectively, inserted into the opening 58. The arms 74 extend into the opening 106 of the knob 22. During insertion, the ramp surfaces 86 engage the ridge 122, causing the arms 74 to flex inwardly. As the projections 78 pass the ridge 122 (see FIG. 22), the arms 74 to flex outwardly. The radial surfaces 82 engage the ridge 122 to connect the cover 18 and the knob 22 and thereby the housing halves 30, 34.

The indicator 134 is positioned to align the pocket 126 with the passage 50. The hooked end of the tape 26 is inserted into the passage 50 until the hook 166 passes the barb 130. The hook 166 momentarily deflects past the barb 130 until reaching the pocket 126. After being fully inserted, the hook 166 expands, and the tip of the hook 166 "catches" on the retaining barb 130, preventing the tape 26 from being pulled out. The tape 26 is thus retained to the knob 26. The knob 22 is then rotated (e.g., counterclockwise in FIG. 5) to wind the tape 26 into the housing assembly 14.

Before or after insertion and/or winding of the tape 26, the plug 138 is inserted into the opening 106. When inserted, the projection 146 engages the inner surface 90 of each projection 78 to prevent the arms 74 from flexing inwardly and the projections 78 from disengaging the ridge 122.

Generally, at least after insertion of the hooked end of the tape 26 into the pocket 126 and past the barb 130 and before or after winding of the tape 26, the label 154 is adhered to the knob 22 and the plug 138. The label 154 retains the plug 138 which, through engagement of the projection 146 with the arms 74, acts to retain the cover 18 and the knob 22.

In use, the tape 26 is dispensed from the housing assembly 14, for example, by pulling on the tape 26. The tape 26 is "fished" to the location where wire installation is to be initiated, the wire(s) (not shown) to be installed are attached to the opening 162 in the tip 158 of the tape 26, and the tape 26 is then used to pull the wire to the termination point of the installation. After use, the tape 26 is wound into the housing assembly 14 (by rotating the knob 22 counterclockwise in FIG. 5).

The cover 18 and the knob 22 are constructed to provide friction between the knob 22 and the housing assembly 14 to resist the "clockspring" effect from the tape 26 and counter unwanted rotation of the knob 22 and unwinding of the tape 26.

The arms 74 have a length to cause the body 66 of the cover 18 to flex and create a spring force. The spring force increases a compressive force and friction between the ridge 98 on the knob 22 and the rim 62 on the front housing half 34. If increased force is required (e.g., due to wear, manufacturing tolerances, etc.), one or more washers (not shown) may be provided, for example, between the ridge 98 and the rim 62, between the ridge 122 and the radial surface 82, and/or between the body 66 and the back housing half 30.

It should be understood that, in other constructions (not shown), the arms 74 and the projections 78 may be provided on the knob 22, and the opening 106 and the ridge 122 may be provided on the cover 18. In such constructions, the plug 138 and the label 154 may be supported on the cover 18.

In other constructions (not shown), other structure may be provided to cause friction between the housing assembly 14 and the knob 22. For example, a threaded fastener (not shown) between the cover 18 and the knob 22 may be tightened to the desired force to resist the "clockspring" effect. As another example, friction pads (not shown) may be provided between the knob 22 and the housing assembly 14 (e.g., between the axial surface of the body 94 and the opening 58, between the ridge 98 and the rim 62, etc.). As yet another example, a detent arrangement (not shown) may be provided to retain the knob 22 in position relative to the housing assembly 14.

In further constructions (not shown), the housing assembly 14, the cover 18 and/or the knob 22 may be constructed to provide friction to resist the "clockspring" effect. For example, a radial pre-load may be provided between the body 94 and the opening 58, between the knob 22 and its pivot, etc.

In the illustrated construction, the cable snake 10 is assembled and retained without fasteners, eliminating parts, reducing manufacturing costs, improving reliability, etc. The cover 18 and the knob 22 are self-retaining through engagement of the ridge 122 with the projections 78 on the arms 74. The connected cover 18 and knob 22 compress and retain engagement of the housing halves 30, 34 and the bosses 42. The plug 138 and the label 154 inhibit disconnection.

As mentioned above, by using the hook 166 and the barb 130, a fastener is not required to retain the tape 26, eliminating the cost of the fastener and the related handling. Also, as a result, the tape 26 can be inserted into the housing assembly 14 at the end of the assembly process. Moving insertion of the tape 26 to the end of the assembly process makes the assembly easier overall (e.g., the assembler is not required to also maneuver a long piece of tape material when completing assembly).

It should be understood that, in other constructions (not shown), the barb 130 may be supported on the tape 26, and the hook 166 may be provided on the knob 22 (e.g., in the pocket 126). In such constructions, the barb 130 on the tape 26 would cause the hook 166 on the knob 22 to flex to allow insertion of the tape 26 and to catch the barb 130.

Preferred embodiments of the invention have been described in considerable detail. Many modifications and variations to the preferred embodiments described will be apparent to a person of ordinary skill in the art. Therefore, the invention should not be limited to the embodiments described.

What is claimed is:

1. A cable snake comprising:
   a housing assembly defining a cavity;
   an actuator rotatably supported by the housing assembly;
   a tape operable to be wound into and unwound out of the cavity, the tape applying an unwinding force, one end of the tape being connected to the actuator; and
   a cover on an opposite side of the housing assembly from the actuator, the cover being non-rotatably connected to the housing assembly, rotation of the actuator relative to the housing assembly causing the tape to be wound into or unwound out of the cavity;
   wherein a friction force is applied to the actuator and the housing assembly, the friction force resisting the unwinding force; and
   wherein the cover and the actuator are connected to apply a spring force to increase the friction force applied to the actuator and the housing assembly.

2. The cable snake of claim 1, wherein one of the cover and the actuator includes a projection extending therefrom and the other of the cover and the actuator defines a recess, the projection engaging the recess to apply the spring force.

3. The cable snake of claim 2, wherein the projection is supported on a flexible arm and selectively engageable with the recess.

4. The cable snake of claim 1, further comprising a retainer assembly between and integral with the actuator and the tape.

5. The cable snake of claim 2, wherein the cover includes the projection and the actuator defines the recess.

6. The cable snake of claim 4, wherein the retainer assembly includes a barb formed on one of the actuator and an end of the tape and a hook formed on the other of the actuator and the end of the tape, the barb being operable to retain the hook.

7. The cable snake of claim 6, wherein the barb is formed on the actuator and the hook is formed on the end of the tape.

8. The cable snake of claim 7, wherein the actuator defines a pocket operable to receive the hook, the barb being proximate the pocket.

9. A cable snake comprising:
   a housing assembly defining a cavity and a passage communicating with the cavity;
   an actuator rotatably supported by the housing assembly;
   a tape operable to be wound into and unwound out of the cavity through the passage; and
   a retainer assembly between and integral with the actuator and the tape, the retainer assembly including a barb formed on one of the actuator and an end of the tape and a hook formed on the other of the actuator and the end of the tape, the end of the tape being inserted into the cavity through the passage, the hook being configured to deflect, pass and engage the barb to retain the tape on the actuator;
   wherein the barb is formed on the actuator and the hook is formed on the end of the tape and the actuator defines a pocket operable to receive the hook, the barb being proximate the pocket.

10. The cable snake of claim 9, wherein the tape applies an unwinding force, and wherein a friction force is applied to the actuator and the housing assembly, the friction force resisting the unwinding force.

11. The cable snake of claim 10, further comprising a cover on an opposite side of the housing assembly from the actuator, the cover and the actuator being connected to apply a spring force to increase the friction force.

12. The cable snake of claim 11, wherein one of the cover and the actuator includes a projection extending therefrom and the other of the cover and the actuator defines a recess, the projection engaging the recess to apply the spring force.

13. The cable snake of claim 12, wherein the cover includes the projection and the actuator defines the recess.

14. The cable snake of claim 12, wherein the projection is supported on a flexible arm and selectively engageable with the recess.

15. The cable snake of claim 12, wherein the projection is a first projection, and the recess is a first recess, and wherein one of the cover and the actuator includes a second projection extending therefrom and the other of the cover and the actuator defines a second recess, the second projection engaging the second recess to apply the spring force.

16. The cable snake of claim 15, wherein the second projection is supported on a second flexible arm and selectively engageable with the second recess.

17. A cable snake comprising:
   a housing assembly defining a cavity;
   an actuator rotatably supported by the housing assembly;
   a tape operable to be wound into and unwound out of the cavity, the tape applying an unwinding force; and
   a cover on an opposite side of the housing assembly from the actuator, the cover being non-rotatably connected to the housing assembly, the actuator being rotatable relative to the cover;
   wherein a friction force is applied to the actuator and the housing assembly, the friction force resisting the unwinding force; and
   wherein the cover and the actuator are connected to apply a spring force to increase the friction force;
   wherein one of the cover and the actuator includes a projection extending therefrom and the other of the cover and the actuator defines a recess, the projection engaging the recess to apply the spring force;
   wherein the projection is a first projection, and the recess is a first recess, and wherein one of the cover and the actuator includes a second projection extending therefrom and the other of the cover and the actuator defines a second recess, the second projection engaging the second recess to apply the spring force.

18. The cable snake of claim 17, wherein the second projection is supported on a second flexible arm and selectively engageable with the second recess.

* * * * *